(12) United States Patent
Pagtakhan et al.

(10) Patent No.: US 12,406,001 B2
(45) Date of Patent: *Sep. 2, 2025

(54) SYSTEMS, METHODS, AND APPARATUSES FOR AUDIENCE METRIC DETERMINATION

(71) Applicant: Comcast Cable Communications, LLC, Philadelphia, PA (US)

(72) Inventors: Andrew Pagtakhan, New York, NY (US); Robert Bress, New York, NY (US); Tracy Nguyen, New York, NY (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/427,102

(22) Filed: Jan. 30, 2024

(65) Prior Publication Data

US 2024/0354341 A1 Oct. 24, 2024

Related U.S. Application Data

(63) Continuation of application No. 17/463,046, filed on Aug. 31, 2021, now Pat. No. 11,934,455.

(51) Int. Cl.
*G06F 16/00* (2019.01)
*G06F 16/2457* (2019.01)
(Continued)

(52) U.S. Cl.
CPC .... *G06F 16/7867* (2019.01); *G06F 16/24578* (2019.01); *G06F 16/71* (2019.01); *G06F 16/75* (2019.01)

(58) Field of Classification Search
CPC ........... G06F 16/7867; G06F 16/24578; G06F 16/71; G06F 16/75; G06Q 30/0242;
(Continued)

(56) References Cited

U.S. PATENT DOCUMENTS

| 2010/0146531 A1* | 6/2010 | Fu | H04H 60/39 |
| | | | 725/14 |
| 2012/0151079 A1 | 6/2012 | Besehanic et al. | |

(Continued)

OTHER PUBLICATIONS

Merriam-Webster.com. Propensity. https://web.archive.org/web/20200820071751/https://www.merriam-webster.com/dictionary/propensity (Year: 2020).

*Primary Examiner* — Syed H Hasan
(74) *Attorney, Agent, or Firm* — Ballard Spahr LLP

(57) ABSTRACT

Methods, systems, and apparatuses for audience metric determination are described herein. An audience segment may be targeted for delivery of content. A clustering algorithm may be used to categorize a quantity of users or devices into subsets based on a propensity to consume, present or output a particular type of content, and a quantity of time to output the particular type of content. A weight may be assigned to each subset based on its relevance to other subsets, such as based on data variance, e.g., on a distance to a midpoint of a specific subset of the subsets. An index parameter may be determined for the datasets, e.g., based on each weight for each subset, and data may be generated that reflects a ranking of content delivery spots for delivery of content to the audience segment.

70 Claims, 12 Drawing Sheets

(51) Int. Cl.
*G06F 16/71* (2019.01)
*G06F 16/75* (2019.01)
*G06F 16/78* (2019.01)

(58) Field of Classification Search
CPC .... G06Q 30/0251; H04H 60/66; H04H 60/47; H04H 60/31; H04N 21/25866; H04N 21/252

See application file for complete search history.

(56) References Cited

U.S. PATENT DOCUMENTS

| | | |
|---|---|---|
| 2012/0260278 A1 | 10/2012 | Lambert et al. |
| 2017/0034591 A1* | 2/2017 | Ray .................... H04N 21/2668 |
| 2017/0140398 A1* | 5/2017 | Fleischman ...... H04N 21/23418 |
| 2017/0171580 A1 | 6/2017 | Hirsch et al. |
| 2019/0005513 A1 | 1/2019 | Bennett |
| 2022/0124398 A1 | 4/2022 | Solarski et al. |
| 2022/0132206 A1* | 4/2022 | Killick ............. H04N 21/44209 |

* cited by examiner

| Column | Cluster | Number of Accounts A | Percentage of Accounts B | Average Distance to Most Relevant Cluster C | Inverse of Average Distance D | Re-weighted inverse distance E | Accounts Re-weighted Inverse Distance F | Final Cluster Weights G |
|---|---|---|---|---|---|---|---|---|
| | Medium Viewers | 593,000 | 80% | 4.7 | 0.21 | 30% | 174,000 | 67% |
| | Heavy Viewers | 121,000 | 20% | 1.9 | 0.52 | 70% | 86,000 | 33% |
| Calculation | | | A/sum(A) | Average Euclidean Distance to the Center of the Heavy Cluster | 1/C | D/sum(D) | A*E | F/sum(F) |

| Network | Week | DayPart | Reach Index | Audience Index | Reach Index | Audience Index |
|---|---|---|---|---|---|---|
| A | 1 | EM | 9.9 | 16.3 | 11.2 | 23.0 |
| A | 1 | DT | 7.0 | 16.2 | 7.4 | 21.9 |
| A | 1 | FR | 7.2 | 15.9 | 7.5 | 20.7 |
| B | 1 | EM | 9.5 | 15.1 | 10.1 | 18.9 |
| B | 2 | ON | 11.3 | 15.3 | 12.3 | 18.8 |
| B | 2 | EM | 11.2 | 15.2 | 12.3 | 18.8 |
| A | 1 | PR | 5.8 | 15.4 | 5.9 | 18.8 |
| B | 1 | ON | 9.0 | 14.9 | 9.5 | 18.5 |
| B | 2 | LF | 11.5 | 15.0 | 12.4 | 17.5 |
| A | 1 | LF | 8.3 | 13.6 | 8.9 | 16.6 |
| B | 2 | DT | 7.9 | 13.7 | 8.1 | 16.1 |
| B | 2 | PR | 8.8 | 14.0 | 9.1 | 16.1 |
| B | 1 | DT | 6.3 | 13.4 | 6.4 | 15.8 |
| B | 2 | FR | 8.5 | 13.7 | 8.8 | 15.8 |
| B | 1 | LF | 8.4 | 13.5 | 8.7 | 15.7 |
| B | 1 | FR | 6.5 | 12.9 | 6.5 | 15.0 |
| A | 2 | DT | 6.6 | 12.1 | 7.0 | 14.9 |
| A | 2 | EM | 8.3 | 11.6 | 9.6 | 14.9 |
| A | 1 | ON | 8.3 | 12.1 | 9.1 | 14.9 |
| B | 1 | PR | 6.0 | 12.6 | 6.1 | 14.3 |

FIG. 5

SYSTEMS, METHODS, AND APPARATUSES FOR AUDIENCE METRIC DETERMINATION

CROSS REFERENCE TO RELATED PATENT APPLICATION

This application is a continuation of U.S. patent application Ser. No. 17/463,046, filed Aug. 31, 2021, which is incorporated herein by reference in its entirety.

BACKGROUND

Various devices receive content for output or rendering, such as from a content provider. The various devices may be categorized according to corresponding content output data that indicates a quantity of time that content is output. For example, the various devices may be clustered based on a propensity to select a particular genre or type of content, such as horror genre content items, for the quantity of time. A quantity of devices associated with the propensity to select the particular genre for a specific period of time may be determined. A parameter associated with the quantity of devices relative to a particular content item may be determined. The determined parameter may not sufficiently reflect a relationship between the categories of various devices and the quantity of time. For example, it may be difficult to consider a level of viewing of individual devices of the quantity of devices in the determination of the parameter. These and other considerations are addressed herein.

SUMMARY

It is to be understood that both the following general description and the following detailed description are exemplary and explanatory only and are not restrictive, as claimed. Methods, systems, and apparatuses for audience metric determination are described herein. Devices that receive content for output may be grouped into subsets of devices, such as via a clustering algorithm based on content viewership data. The grouping into subsets may result in subsets of devices in which each subset is associated with an extent (e.g., level) of viewership of a particular type of content item by a particular audience segment. For example, a subset may comprise devices associated with relatively high viewership of the particular type of content item. For example, another subset may comprise devices associated with relatively low viewership of the particular type of content item. A rank metric such as an index parameter may be used to indicate a comparison of one or more device clusters each associated with the particular audience segment that is rendering a specific content item and/or content channel to a total number of devices that are rendering the specific content item and/or content channel. One or more weights of the index parameter may be determined based on the clustering algorithm. Data may be indicative of a ranking of content delivery spots based on the index parameter. The ranking may be based on the likelihood that a content delivery spot would include a significant quantity of devices of the particular audience segment and of a particular extent of viewership. Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 4 shows example features of a weighting model;

FIG. 5 shows example results of an example index parameter;

DETAILED DESCRIPTION

Figure 1:
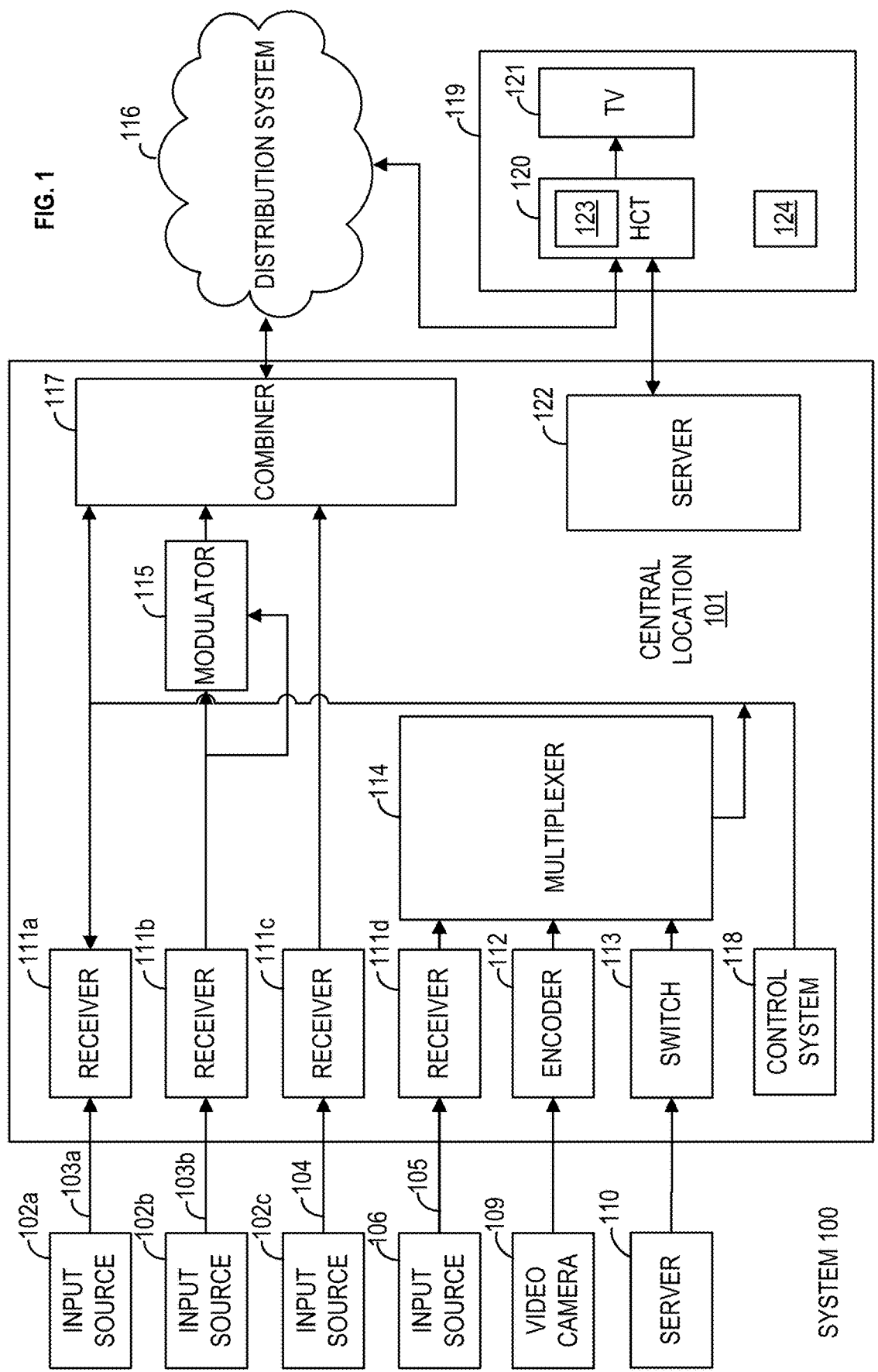
FIG. 1 shows an example environment in which the present methods and systems may operate.

Before the present methods and systems are described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Described are components that may be used to perform the described methods and systems. These and other components are described herein, and it is understood that when combinations, subsets, interactions, groups, etc. of these components are described that while specific reference of each various individual and collective combinations and permutation of these may not be explicitly described, each is specifically contemplated and described herein, for all methods and systems. This applies to all aspects of this application including, but not limited to, steps in described methods. Thus, if there are a variety of additional steps that may be performed it is understood that each of these additional steps may be performed with any specific embodiment or combination of embodiments of the described methods.

The present methods and systems may be understood more readily by reference to the following detailed description and the examples included therein and to the Figures and their previous and following description. As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, flash memory internal or removable, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, may be implemented by special purpose hardware-based computer systems that perform the specified functions or steps, or combinations of special purpose hardware and computer instructions.

FIG. 1 illustrates various aspects of an example environment in which the present methods and systems may operate. The environment is relevant to systems and methods for trick mode automation applied to content items provided by a content provider. Those skilled in the art will appreciate that present methods may be used in systems that employ both digital and analog equipment. One skilled in the art will appreciate that provided herein is a functional description and that the respective functions may be performed by software, hardware, or a combination of software and hardware.

The system 100 may comprise a central location 101 (e.g., a headend), which may receive content (e.g., data, input programming, and the like) from multiple sources. The central location 101 may combine the content from the various sources and may distribute the content to user (e.g., subscriber) locations (e.g., location 119) via distribution system 116. The central location 101 may receive content from a variety of sources 102a, 102b, 102c. The content may be transmitted from the source to the central location 101 via a variety of transmission paths, including a wireless (e.g. satellite paths 103a, 103b) and terrestrial path 104. The central location 101 may also receive content from a direct feed source 106 via a direct line 105. Other input sources may comprise capture devices such as a video camera 109 or a server 110. The signals provided by the content sources may include a single content item or a multiplex that includes several content items.

The central location 101 may comprise one or a plurality of receivers 111a, 111b, 111c, 111d that are each associated with an input source. For example, MPEG encoders such as encoder 112, are included for encoding local content or a video camera 109 feed. A switch 113 may provide access to server 110, which may be a Pay-Per-View server, a data server, an internet router, a network system, a phone system, and the like. Some signals may require additional processing, such as signal multiplexing, prior to being modulated. Such multiplexing may be performed by multiplexer (mux) 114. The central location 101 may comprise one or a plurality of modulators 115 for interfacing to the distribution system 116. The modulators may convert the received content into a modulated output signal suitable for transmission over the distribution system 116. The output signals from the modulators may be combined, using equipment such as a combiner 117, for input into the distribution system 116.

The distribution system 116 may comprise memory for storing data regarding the modulated output signals distributed via the distribution system 116. For example, the memory may comprise a database that stores viewership data of the content delivered via the distribution system 116. For example, the database may store metadata indicative of subsets of various devices. The various devices may be configured to receive content, such as from a content provider via the distribution system 116, at corresponding device locations (e.g., a corresponding user location 119 for each device). The received content may be at least one of a content item, content channel, content network, content program, and/or the like. The various devices may be categorized or classified according to multiple subsets. For example, each device may be clustered into a subset of the multiple subsets, such as based on a clustering algorithm. The clustering algorithm may use historical device usage data aggregated via the distribution system 116, for example. The historical device usage data may comprise viewing duration data, network data, genre data, and/or the like. The metadata stored in the database may indicate the subsets or clusters.

For example, the device may be clustered into subsets based on an extent of usage, such as including a light subset, a medium subset, a heavy subset, and/or the like. Devices clustered in the light subset, medium subset, and the heavy subset may be associated with light viewers, medium viewers, and heavy viewers of the content, respectively. For example, the clustered subsets of devices may be grouped based on a propensity for the devices to output a particular genre (e.g., cluster devices based on what genres that the corresponding users of the devices tend to view) of content received via the distribution system 116. Subsets of devices grouped based on propensity may include a horror movie subset, sports enthusiast subset, a news network subset, situational comedy subset, 18 to 34 demographic subset, and/or the like. The subsets determined based on propensity to output a genre may be used to target a particular audience segment, such as a horror genre audience segment. At least one threshold may be used to determine which subset that a device of the various devices is clustered into. The closer that a particular device is to a center of a subset, the more likely the particular device may be clustered into the subset. The at least one threshold may indicate at least one quantity of time that distinguishes the subsets. For example, a device may be clustered into the heavy subset based on the device outputting the received content for a time that exceeds the at least one threshold. The clustering into the light subset, the medium subset, and the heavy subset may depend on a distribution (e.g., statistical distribution) of the various devices.

A control system 118 may permit a system operator to control and monitor the functions and performance of system 100. The control system 118 may interface, monitor, and/or control a variety of functions, including, but not limited to, the channel lineup for the television system, billing for each user, conditional access for content distributed to users, and the like. Control system 118 may provide input to the modulators for setting operating parameters, such as system-specific MPEG table packet organization or conditional access information. The control system 118 may be located at central location 101 or at a remote location. The control system 118 may monitor what content is distributed to the various devices. For example, the control system 118 may determine durations of time that the various devices (e.g., televisions) are outputting content of a particular television channel, particular content program or item, streaming content service, a particular genre, and/or the like. This way, the control system 118 may determine devices associated with users or viewers of a specific type of content, such as a family in a household viewing content from a specific television channel.

For each device of the various devices, the distribution system 116 may distribute signals from the central location 101 to user locations, such as user location 119. The distribution system 116 may be an optical fiber network, a coaxial cable network, a hybrid fiber-coaxial network, a wireless network, a satellite system, a direct broadcast system, or any combination thereof. There may be a multitude of user locations connected to distribution system 116. Each user location of the multitude of user locations may include one or more devices of the various devices. At a particular user location 119, a network device, such as a gateway, set-top box (STB), or home communications terminal (HCT) 120 may decode, if needed, the signals for display on a display device, such as on a display 121, such as a television set (TV) or a computer monitor. The HCT 120 may be in communication with one or more user devices 124. Those skilled in the art will appreciate that the signal may be decoded in a variety of equipment, including an HCT, an STB, a computer, a TV, a monitor, or a satellite dish.

The HCT 120 or other network devices may transmit signals to create location-based zones. For example, the HCT 120 may broadcast a beacon signal, such as a Bluetooth® beacon, radio frequency (RF) beacon, wireless beacon, and/or the like. If a user device 124 responds to the beacon signal, then the user of the user device 124 may be considered to be located in a zone in front of the television display 121. For example, the user device 124 may send a signal comprising an acknowledgment to the HCT 120. For example, a response of the user device 124 may be used to determine that the television display 121 is displaying a particular type of content and that a viewer may be presumed to be in front of the television display 121. The HCT 120 may communicate with the distribution system 116 and/or the control system 118 to determine, for each device of the various devices, whether at least one viewer is actually viewing content while the corresponding device is outputting content, what type of content is being output, for what duration of time, and/or the like. The television display 121, the HCT 120, or some other device in the zone may comprise a sensing component such as a camera to monitor how many viewers and for how long the viewers are actually watching the content output to the television display 121. This determination and monitoring of viewers watching content at each user location 119 may be used to collect device usage data (e.g., to collect historical viewership data) aggregated and/or stored by the distribution system 116. The zone may be created such that any user associated with a user device 124 outside of the zone may be presumed to not be in front of the television display 121.

The HCT 120 may have logic 123. The logic 123 in the HCT 120 may monitor the content presented on the television display 121. The logic 123 in the HCT 120 may detect the one or more user devices 124 present, such as based on the beacon signals. The logic 123 in the HCT 120 may create and/or access one or more profiles corresponding to one or more user devices 124 based on the content presented on the television display 121 when the one or more user devices is determined to be present. The user profiles may be part of the historical viewership data stored by or retrievable by the distribution system 116 and/or control system 118. For example, the user profiles or historical viewership data may be stored by a server, such as a ranker server 122. The ranker server 122 may be located at the central location 101 or located remotely (e.g., as part of the distribution system 116). For example, the user profiles may indicate what type of content that a viewer has a propensity to view, such as via a corresponding user device 124 of the viewer outputting content items of that specified type. Multiple user devices 124 associated with the propensity to view the same type of content may form an audience segment, such as a cooking enthusiastic segment. The ranker server 122 may calculate an index parameter such as a ranker for particular audience segments such as a sports enthusiast audience segment. The ranker server 122 may calculate the index parameter for a requested audience segment based on a request for a ranking of broadcast slots such as slots each corresponding to a particular television network and/or particular time of day.

A portion of the logic 123 may reside on the one or more user devices 124 and/or on a server located upstream from the HCT 120, such as the ranker server 122. For example, the ranker server may be configured to output a data such as a data structure indicative of a ranking of time slots for a requested audience segment. For example, the ranker server may output a list of time slots and/or types of content networks such as a list of television network and daypart combinations in order of the extent (e.g., ratio) that viewers of the requested audience segment are likely to be viewers during the corresponding time slot as compared to a general population of viewers (e.g., not clustered into a particular audience segment). The ranker server 122 may be in communication with the HCT 120 through a communication network provided by the HCT 120 and/or another communication device. The communication may enable the ranker server 122 to receive information about the content presented on the television display 121 that is monitored by the HCT 120 and/or logic 123, such as historic viewership data via the distribution system 116, the control system 118, and/or the HCT 120.

The user location 119 may be fixed or not fixed. For example, a user may receive content from the distribution system 116 on a mobile device such as a laptop computer, PDA, tablet, smartphone, GPS, vehicle entertainment system, portable media player, and/or the like. The user device 124 may be located at the user location 119. The user device 124 comprise software to link the viewership data determine by the distribution system 116, the control system 118, and/or the HCT 120 with a user profile corresponding to the user device 124. The software may configure the user device 124 to be compatible with Bluetooth®, Bluetooth® Low Energy (BLE), WiFi, Zigbee, Xbee, or any suitable protocol. An HCT 120 may send and receive data to and from the user device 124. The logic 123 may use the data and the content displayed on the display 121 to create the user profile for the user device 124. The user profile may include information indicative of a channel that is currently being viewed based on tuners in the HCT 120 or content that is currently being viewed on the display 121 based on an electronic programming guide (EPG) or metadata. The information may be determined via the logic 123.

Figure 2:
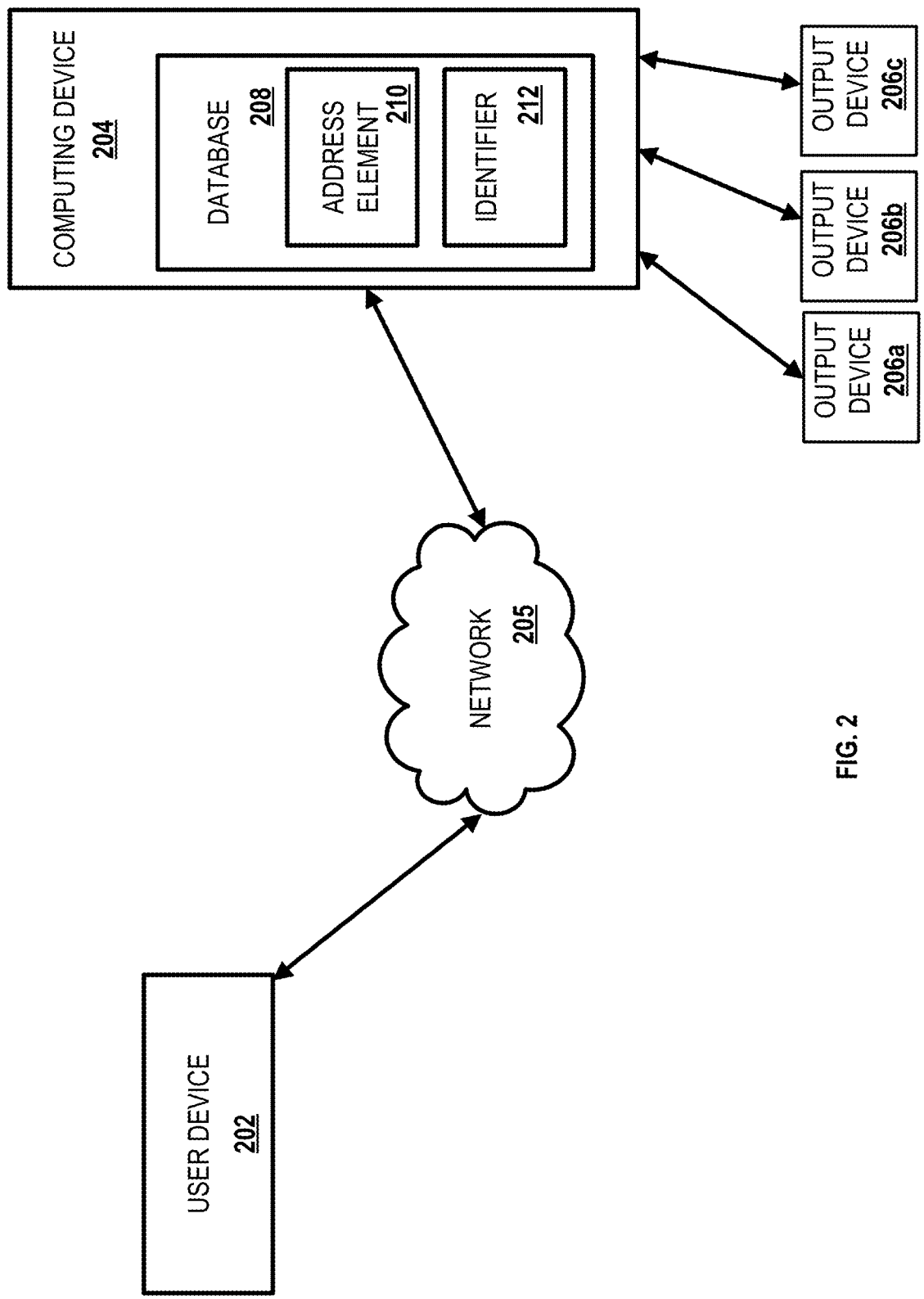
FIG. 2 shows an example environment in which the present methods and systems may operate.

FIG. 2 shows an example environment in which the present methods and systems may operate. The environment is relevant to systems and methods for device ranking, such as a ranking of time slots based on an index parameter. One skilled in the art will appreciate that provided herein is a functional description and that the respective functions may be performed by software, hardware, or a combination of software and hardware. The user device 202 may be in communication with a computing device 204 such as a computer, a server (e.g., ranker server 122), a cloud computing system, a database, and/or the like. For example, the user device 202 may be in communication with the computing device 204 via a network 205. The network 205 may be a private and/or public network such as the Internet or a local area network. The computing device 204 may be disposed locally or remotely relative to the user device 202. The user device 202 may be configured to request a ranking associated with a target device subset (e.g., target audience segment) from the computing device 204. The target audience segment may be a portion of a group of content output devices (e.g., a portion of output devices 206a, 206b, 206c) that are grouped into the target audience segment based on a propensity to output or view a particular type of content.

The particular type of content may be a particular genre, type of content, content network, and/or the like. For example, the target audience segment may comprise a portion of content output devices 206a, 206b, 206c or the users associated with the portion of content output devices 206a, 206b, 206c. The quantity of content output devices 206a, 206b, 206c may exceed, equal, or be less than the three depicted example devices 206a, 206b, 206c. The portion of content output devices 206a, 206b, 206c may be grouped based on an extent or level that the portion of content output devices 206a, 206b, 206c output a particular type of content. For example, the portion of content output devices 206a, 206b, 206c may be grouped into a light viewer subset, a medium viewer subset, or a heavy viewer subset for the particular type of content. For example, depending on a duration of time that a particular content output device outputs content from a particular television network, it may be assumed to what extent (e.g., duration of time) that users or viewers associated with the particular content output device view content from the particular television network. It may be determined whether the extent corresponds to the light viewer subset, the medium viewer subset, or the heavy viewer subset.

The associated users of the particular content output device may be an individual viewer or multiple viewers of content such as in a household, for example. For example, the target audience segment may be a horror movie audience segment, a cooking enthusiast audience segment, a sports enthusiast audience segment, a drama content network audience segment, a new content network audience segment, and/or the like. Based on the request, the user device 202 may receive a ranking of time slots. Based on the request, the user device 202 may receive a ranking of content networks. For example, the user device 202 may receive data comprising a data structure, a matrix, a list, a spreadsheet, or a table. For example, the received data may rank multiple combinations of television networks and dayparts based on an index parameter. The index parameter may be indicative of viewing participation of the target audience segment compared to a general population of viewers that are viewing a particular combination of television network or content item and daypart (e.g., early morning, daytime, fringe, late fringe, overnight, or primetime).

For example, a football game broadcast by a television network at primetime may have a high index parameter for the sports enthusiast target audience segment because the index parameter indicates that the viewership of the football game at primetime by sports enthusiasts is higher than the viewership of the football game at primetime by the general population. The index parameter may indicate a percentage or ratio that the viewership by the target audience segment exceeds (or underperforms) viewership by the general population. If the target audience segment is the sports enthusiast audience segment, the received data may rank the football game at primetime higher than a home improvement show at primetime or a baseball game at daytime, for example. An index parameter may be calculated by each combination of television network or content item and daypart. Each respective index parameter may be used to rank each combination indicated by the received data.

The user device 202 may use the received data to determine how to deliver targeted advertisements. For example, the user device 202 may use the highest ranked combination of the received data to determine a television network, a content item (e.g., a content program such as a reality television series), a time slot, a combination of the above, and/or the like. For example, if a targeted consumer of advertisements is the sports enthusiast audience segment, the user device 202 may determine that a purchase of an advertisement time slot for delivery of advertisements during the football game broadcast by a sports television channel at Saturday primetime may be most effective to deliver targeted advertisements to devices or users in the sports enthusiast audience segment. The combination of the football game, sports television channel, and Saturday primetime may have a high or the highest index parameter of all the combinations indicated by the received data. The advertisement time slot or other advertisement delivery options may be determined based on respective index parameters, rankings, cost, and/or other considerations. The user device 202 may be used to indicate a selection or purchase of an advertisement delivery option to the computing device 204.

The computing device 204 may be used by a seller of advertisement delivery options comprising time slots that represent various combinations of broadcasts of television networks during a particular daypart (e.g., a time period of a television broadcast day). For example, the user device 202 may comprise a communication element for providing an interface (e.g., user interface) to a user to interact with the user device 202 and/or the computing device 204. The user interface may be any interface for presenting and/or receiving information to/from the user, such as user feedback. The user device 202 may be an electronic device such as a computer, a smartphone, a laptop, a tablet, a display device, or any other device configured for communicating with the computing device 204 to receive data that recommends or ranks an advertisement delivery option, such as a time slot, television network, content program, or combination thereof. The computing device 204 may be configured to determine subsets of the content output devices 206a, 206b, 206c. The computing device 204 may receive an indication of a target audience segment and an extent of viewership from the user device 202. For example, the indication may include medium viewers and heavy viewers within a cooking enthusiast target audience segment. The computing device 204 may group a total population of devices (e.g., the content output devices 206a, 206b, 206c, although the total population of devices is not limited to three) into subsets.

For example, the computing device may execute a clustering algorithm to cluster the total population of devices into the indicated subsets. The clustering algorithm may be a machine learning algorithm, such as a k-means clustering algorithm. The clustering algorithm may be a hierarchal, agglomerative, model-based, or other suitable clustering algorithms. Based on the clustering algorithm, the computing device 204 may cluster the total population of devices according to propensity to output particular genres of content. The output devices 206a, 206b, 206c may provide viewership data to the computing device 204. For example, the computing device 204 may monitor information regarding content provided to the output devices 206a, 206b, 206c by a content provider. The viewership data may include viewership duration data, content genre data, content network data, content program data, content title data, audience segment data (e.g., males 25-49, women 20-45, etc.), viewer demographic data, and/or the like. The viewership data may be stored in the database 208, for example. Based on the viewership data, clusters based on particular genres may be determined. This way, the computing device 204 may determine the devices grouped into a cooking enthusiast subset of the output devices 206a, 206b, 206c as the target device subset specified by the user device 202.

Based on the viewership data, clusters based on viewership (e.g., viewership duration) may be determined by the computing device 204. For example, categories of viewership duration may be defined based on a subset threshold determined via the clustering algorithm. For example, a rank parameter (e.g., rank-order) of the clustering algorithm may be used to determine that a top 40% of devices clustered into the cooking enthusiast subset are considered heavy viewers (e.g., categorized within the heavy viewer viewing duration category). This way, the computing device 204 may determine which devices clustered into the cooking enthusiast subset are also clustered into the medium viewer subset and heavy viewer subset, as specified by the indication from the user device 202. The computing device 204 may cluster the output devices 206a, 206b, 206c by various audience segments of interest (e.g., into subsets by genre or content network) and cluster the output devices 206a, 206b, 206c by viewing duration category based on rank (e.g., into the light viewer subset, medium viewer subset, heavy viewer subset).

The computing device 204 may use the determined subsets to determine index parameters. For example, the computing device 204 may calculate an index parameter for a subset corresponding to the target audience segment indicated by the user device 204. For example, the computing device 204 may calculate the index parameter for the cooking enthusiast subset based on a proportion of output devices in the cooking enthusiast subset that output a particular combination of content network and daypart (e.g., a baking show on a food content network during a fringe daypart) compared to the total quantity of output devices in the cooking enthusiast subset. The computing device 204 may calculate the index parameter for the cooking enthusiast subset also based on a proportion of all output devices that output the baking show during the fringe daypart compared to the total quantity of output devices that could have output the baking show. The index parameter may be indicative of a ratio of viewership for devices clustered into the cooking enthusiast subset compared to viewership for the total quantity of output devices (e.g., the general population of viewers).

The determined index parameters may be stored in the database 208 as metadata. For example, the index parameters may be remotely determined/calculated such as by a remote cloud computing system, and sent to the computing device 204 for local storage in the database 208. A weight for the index parameter determination/calculation may be assigned by the computing device 204 for each viewing duration category. For example, in the determination/calculation of the index parameter, the computing device 204 may assign a different weight to the medium viewer cooking enthusiast and to the heavy viewer cooking enthusiast depending on a respective distance metric, as discussed further with reference to FIG. 3 below. The distance metric may be determined, for example, based on an average Euclidean distance to a center of the cluster representing the heavy viewer cooking enthusiast subset. The use of weights in the determination/calculation of the index parameter may yield a more accurate index parameter determination/calculation because the respective quantity of time that an average medium viewer cooking enthusiast and an average heavy viewer cooking enthusiast view the baking show during the fringe daypart is considered in the index parameter determination/calculation. The determination/calculation of the weighted index parameters for the cooking enthusiast subset may be used by the computing device 204 to generate an index parameter ranking for the baking show during the fringe daypart.

The computing device 204 may calculate weighted index parameters for the cooking enthusiast subset for various combinations of content network/item and daypart. The computing device 204 may use the determined weighted index parameters to generate a data comprising a ranking of the various combinations of content network/item and daypart for the cooking enthusiast subset. The various combinations may be ranked in terms of a likelihood of effectively targeting cooking enthusiast subset viewers by delivering advertisements during a particular combination of content network/item and daypart. For example, content networks/items or time slots may be ranked in a descending order starting from the content network/item and daypart combination (e.g., chef competition content program broadcast during primetime) having the highest index parameter, which indicates that the ratio of viewership by cooking enthusiast viewers compared to viewership by the general population viewers is highest for the chef competition content program broadcast during primetime compared to respective ratios for other combinations indicated by the data.

The computing device 204 may send the generated data to the user device 202. For example, the user device 202 may use the generated data to create a media plan. The computing device 204 may comprise a communication element to enable communication with the output devices 206a, 206b, 206c and the user device 202. Other software, hardware, and/or interfaces may be used to provide communication between the user device 202, the computing device 204, the output devices 206a, 206b, 206c, or combination thereof. The communication element 106 may be used to request or query various information such as viewership data from a local source and/or a remote source via the database 208. The database 208 may be associated with an identifier 212. The identifier 212 may be any identifier, token, character, string, or the like, for differentiating the computing device 204 from other devices such as another computing server. The identifier may be dynamic, static, temporary, and/or persist for a specified or unspecified time. Other information may be represented by the identifier 212. The identifier 212 may comprise an address element 210.

The address element 210 may comprise or provide an internet protocol address, a network address, a media access control (MAC) address, an Internet address, and/or the like. The address element 210 may be relied upon to establish a communication session between the user device 202 and the computing device 204 or other devices and/or networks. The address element 210 and the identifier 212 may be stored in the database 208. The address element 210 may be used as an identifier or locator of the computing device 204. The address element 210 may be persistent for a particular network. The address element 210 may be used to identify or retrieve data. The computing device 204 may provide or enable data flow to the user device 202, such as information on targeted audience segments and content time slots and/or advertising time slots.

The user device 202 may render a user interface (UI). The UI may be part of an application, such as a mobile application executed on the user device 202. The mobile application may be used to output the data generated by the computing device 204, for example. The UI may include a communication interface such as a web browser (e.g., Internet Explorer®, Mozilla Firefox®, Google Chrome®, Safari®, or the like), media player, application (e.g., web application, mobile application, media device application), and/or the like. The UI may be used to specify a target audience segment such that the data may be generated for the specified target audience segment (e.g., to rank time slots or content networks/items by index parameter or likelihood of having viewers clustered into a target audience subset corresponding to the specified target audience segment).

The computing device 204 may manage the communication between the user device 202 and the database 208 for sending and receiving data therebetween. The database 208 may store viewership data (e.g., associated with the output devices 206a, 206b, 206c), weights, index parameters, clusters, datas, rankings, metadata, or other information. The user device 202 may request and/or retrieve information from the database 208. For example, the user device 202 may request a ranking of combinations of time slots (e.g., dayparts), content networks, or content programs for ranking television advertising spots to purchase based on outreach to the target audience segment. Based on the request, the computing device 204 may send the data generated for the target audience segment. The database 208 may store information relating to the user device 202 or the computing device 204. The database 208 may be disposed remotely from the computing device 204 and accessed via direct or indirect connection. The database 208 may be integrated with the computing system 204 or some other device or system.

Network devices may be in communication with a network such as the network 205. The network devices may facilitate the connection of a device, such as the user device 202, the computing device 204, or the output devices 206a, 206b, 206c to the network 205. The network 205 may comprise public networks, private networks, wide area networks (e.g., Internet), local area networks, and/or the like. The network 205 may comprise a content access network, content distribution network, and/or the like. The network 205 may be configured to provide communication between the user device 202, the computing device 204, the output devices 206a, 206b, 206c, and/or other electronic devices. The network 205 may comprise network adapters, switches, routers, modems, and the like connected through wireless links (e.g., radio frequency, satellite) and/or physical links (e.g., fiber optic cable, coaxial cable, Ethernet cable, or a combination thereof). The network devices may be configured as a wireless access point (WAP). The network devices may be configured to allow one or more wireless devices to connect to a wired and/or wireless network using Wi-Fi, Bluetooth or any desired method or standard. The network devices may be configured as a local area network (LAN). The network devices may comprise a dual band wireless access point. The network devices may comprise an identifier. The identifier may be or relate to an Internet Protocol (IP) Address IPV4/IPV6 or a media access control address (MAC address) or the like. The identifier may be a unique identifier for facilitating communications on the physical network segment.

Figure 3:
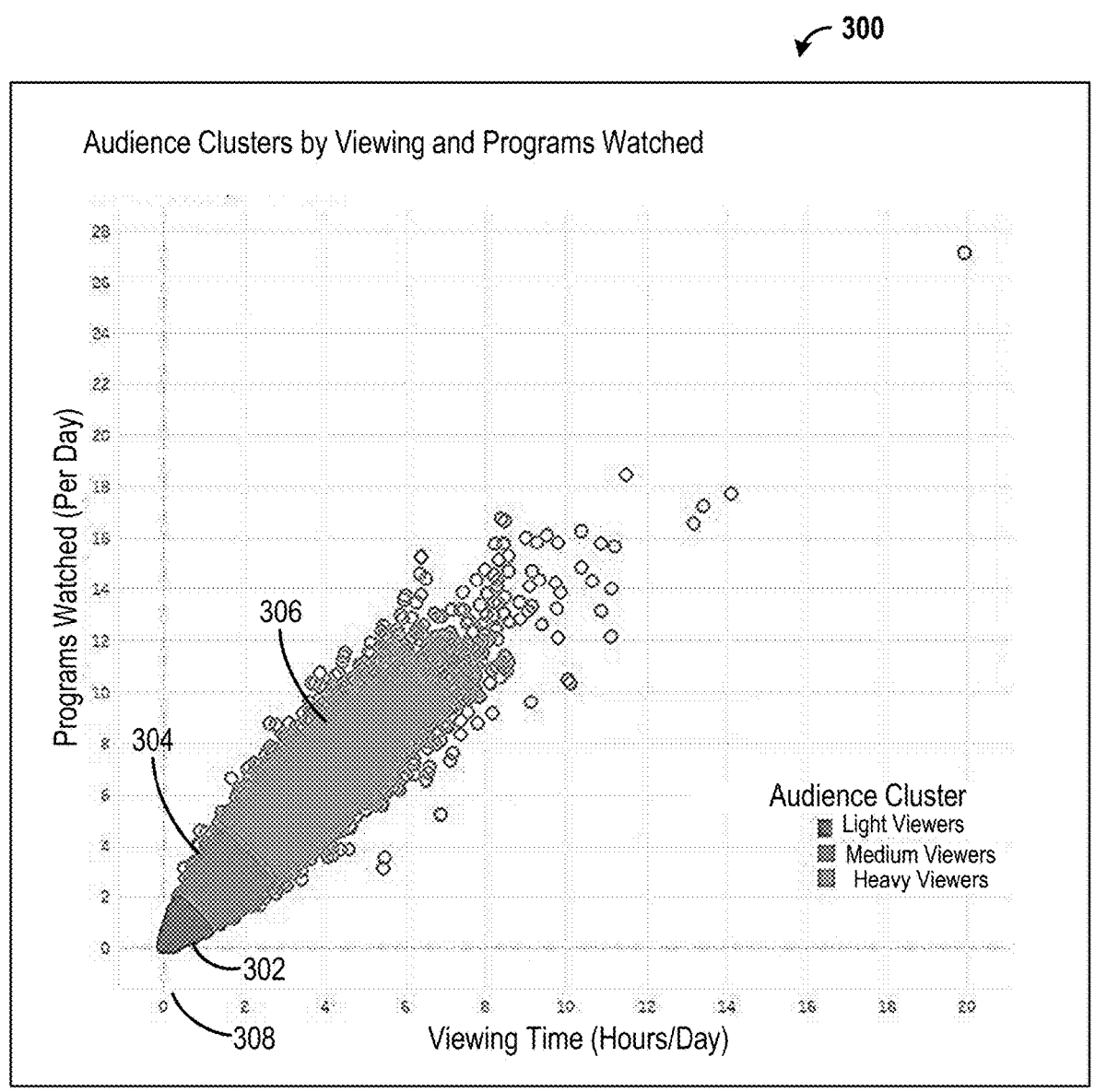
FIG. 3 shows example results of a predictive model.

FIG. 3 illustrates example results of a predictive model related to the present methods and systems. The example results may include a graph 300 illustrating example clusters of devices determined via a clustering algorithm. The clustering algorithm may be a k-mean, mean-shift, hierarchal, agglomerative, model-based, unsupervised machine learning algorithm, or other suitable clustering algorithm. The clusters of devices may represent clusters of users or clusters of viewers, for example. For example, the clusters of devices may be subsets of a general population of devices that are clustered based on a volume, frequency, or another level of viewership or propensity to select a particular type of content such as a content network or genre. For example, the general population of devices may be clustered into subsets based on an extent of usage, such as being clustered into a light viewer subset 302, a medium viewer subset 304, and a heavy viewer subset 306. The devices clustered into the subsets may be affiliated with the respective extent of viewership identified by the respective subset. Devices clustered in the light subset, medium subset, and the heavy subset may be associated with light viewers, medium viewers, and heavy viewers of the particular type of content, respectively. For example, general population of devices may be clustered into subsets based on content network or genre provided by a user of a user device (e.g., user device 202).

The user may be a potential purchaser of an advertising spot corresponding to a combination of a content network and time slot. For example, the combination may be a combination of a television network and a daypart. A television broadcast may be split into dayparts including early morning, daytime, fringe, late fringe, overnight, primetime, and/or the like. The user may be searching for a television network and daypart combination to better target a customized segment of the general population of devices. The customized segment may represent a target audience segment of a general population of television viewers, for example. For example, the user may specify that the user is targeting a horror movie viewer audience subset, cooking enthusiast viewer subset, news television network viewer subset, home improvement television network viewer subset, and/or the like. A duration or subset threshold to distinguish viewers of a selected subset such as the horror movie viewer audience subset, may be determined based on the extent of usage. For example, it may be manually defined that top 10% of viewers of horror movies are considered heavy viewers and the bottom 10% of viewers of horror movies are considered light viewers. For example, a subset threshold of two hours per week may be manually defined to distinguish between the light subset 302, medium subset 304, and the heavy subset 306.

Rather than being manually defined, the subset threshold to distinguish between the light subset 302, medium subset 304, and the heavy subset 306 may be determined via the clustering algorithm. For example, the clustering algorithm may involve assigning a rank parameter (e.g., rank-order) within clusters to define viewing duration categories such as the light subset 302, medium subset 304, and the heavy subset 306. Based on the rank parameter, it may be determined that the top 40% of the horror movie viewer audience segment (e.g., corresponding to the horror movie subset/cluster of devices of the general population of devices being clustered) are clustered into the heavy subset 306, for example. For example, the rank parameter may be used to determine that devices corresponding to viewers that view content at a particular quantity or rate (e.g., minutes, minutes of viewing per day) may be clustered into the medium subset 304 or the heavy subset 306. Another threshold besides the particular quantity or rate may be used to separate devices clustered into the medium subset 304 or the heavy subset 306. The closer that a particular device is to a center of a subset, the more likely the particular device may be clustered into the subset. Using the rank parameter clustering algorithm to define the viewing duration categories may advantageously reduce manual definition of viewing duration categories. The clustering algorithm may cluster the general population of devices by level of viewership or propensity to select a particular type of content based on viewership data. The viewership data may comprise viewership duration data, content genre data, content network data, content program data, content title data, and/or the like.

The graph 300 illustrates the results of an example clustering algorithm clustering devices based on level of viewership and content, such as for a particular target audience subset. The x-axis 308 of the graph 300 indicates a duration in minutes representing a time that various viewers using a corresponding subset of the general population of devices view a particular combination of content and time slot. For example, the x-axis 308 may indicate how much time that horror movies airing on a television network is being viewed or output on a device. For example, the x-axis 308 may indicate how much time that a particular zombie horror movie airing on a particular television network during a primetime daypart is being viewed or output on a device. The duration value labels on the x-axis 308 may range from zero to thirty five thousand. The y-axis 310 of the graph 300 indicates a quantity of devices that are outputting or being used to view the content (e.g., horror movies) for a particular duration such as five thousand minutes. Each dot on the graph 300 may represent a quantity of devices, as indicated by the y-axis 310, that views the content for the corresponding duration of time indicated by the x-axis 308. The dots may be clustered into subsets, such as the light subset 302, medium subset 304, and the heavy subset 306. The dots corresponding to a viewership duration of one thousand minutes or less may be clustered into the light subset 302. The dots corresponding to a viewership duration of four thousand minutes or less may be clustered into the medium subset 304. The dots corresponding to a viewership duration that exceeds four thousand minutes may be clustered into the heavy subset 306.

The clustering may be used to determine in conjunction with a calculated index parameter to send a ranking of various combinations of content networks and time slots to the potential purchaser of an advertising spot. The ranking may reflect how effective a particular combination of content network and time slot would be in terms of delivering targeted content (e.g., advertisements) to the particular target audience subset. The potential purchaser may consider the ranking for various target audience subset (e.g., as defined by the clustering algorithm rather than being manually defined) to better reach target audience subsets with targeted content while considering cost of various advertising spots, for example. A weight may be assigned during the determination of the index parameter to improve the accuracy of the index parameter. For example, the weight may be assigned based on clusters determined via the clustering algorithm. The weight may be assigned based on a distance from each point within a subset (e.g., the light subset 302, medium subset 304, or the heavy subset 306) to a center point of one of the subsets. For example, the center point may be a midpoint of the heavy subset 306 that is located in the center of the points clustered into the heavy subset 306.

An average distance, such as an Euclidean distance, may be determined for each point clustered into the medium subset 304 with respect to the center point of the heavy subset 306. Another average distance may be determined for each point clustered into the heavy subset 306 with respect to the center point of the heavy subset 306. Weights for the medium subset 304 and the heavy subset 306 may be determined based on the respective determined average distances. The weights may enable the index parameter to more accurately reflect whether an advertising spot, such as a content network and daypart combination, is more likely to contain viewers who are clustered into the target audience subset desired by the potential purchaser of the advertising spot. For example, a higher relative weight may be assigned to the heavy subset 306 relative to the medium subset 304 if heavy viewers corresponding to the heavy subset 306 are more likely to view "heavily" during the content network and daypart combination. For example, the heavy subset 306 may be assigned a higher relative weight: (1) the higher the average distance of the heavy subset 306 is to the center point of the heavy subset 306, or (2) the lower the average distance of the medium subset 304 is to the center point of the heavy subset 306. Similarly, the heavy subset 306 may be assigned a lower relative weight: (3) the higher the average distance of the medium subset 304 to the center point of the heavy subset 306; or (4) the lower the average distance of the heavy subset 306 to the center point of the heavy subset 306.

Accordingly, for example, if the viewers corresponding to the medium subset 304 on average view during the content network and daypart combination twenty minutes relatively less than viewers corresponding to the heavy subset 306, then the heavy subset 306 receives a weight that is twenty percent greater than the medium subset 304 in the index parameter determination/calculation for the content network and daypart combination because more "heavier" viewers may be targeted during content network and daypart combination. Considering both viewers corresponding to the medium subset 304 and the heavy subset 306 may yield a more precise index parameter value because all viewers corresponding to the medium subset 304 and the heavy subset 306 may be included in the index parameter determination/calculation but according to a sliding scale of weight depending on how "heavily" (e.g., extent of viewership, relative duration or how much the content is viewed) viewers view the content.

FIG. 4 illustrates example features of a weighting model 400 related to the present methods and systems. The weighting model 400 may illustrate how different weights are assigned to different subsets in an index parameter determination/calculation. The different subsets may correspond to different viewing duration categories such as medium viewers and heavy viewers clustered into a particular target audience segment that view a particular type of content item. For example, the particular target audience segment may be a sports enthusiast target audience segment. For example, the weighting model 400 may be used to calculate weights for medium viewer sports enthusiasts and heavy viewer sports enthusiasts relative to the particular type of content item, such as a basketball game airing on a sports television channel during a Sunday daytime daypart. The weights of the weighting model 400 may be used to calculate an index parameter. The weights of the weighting model 400 may be used to adjust an index parameter by reweighting an existing determined index parameter. For example, a reach index parameter may be calculated by Equation 1(a) and an audience index parameter may be calculated by Equation 1(b):

$$\left(\left(\frac{HHID \text{ Segment Size}}{\text{Total Segment } UE}\right) \div \left(\frac{HHID \text{ Size}}{\text{Total } UE}\right)\right) \quad \text{Equation 1(a)}$$

$$\left(\left(\frac{HHID \text{ Segment Viewing Duration}}{\text{Total Segment } UE \text{ Viewing Duration}}\right) \div \left(\frac{HHID \text{ Size Viewing Duration}}{\text{Total } UE \text{ Viewing Duration}}\right)\right) \quad \text{Equation 1(b)}$$

wherein HHID Segment Size represents a quantity of households of a specific audience segment that tune in to a television network broadcast for a particular network daypart combination, HHID Segment Viewing Duration represents the total viewing time for the HHID Segment Size, Total Segment UE represents a total number of households of the specific audience segment that tune into television network broadcasts across all possible network daypart combinations, Total Segment UE Viewing Duration represents the total viewing time for the Total Segment UE, HHID Size represents all households that tune into the television network broadcast for a particular network daypart combination, HHID Size Viewing Duration represents the total viewing duration for the HHID Size, Total UE represents all households across all television network broadcasts and dayparts, and Total UE Viewing Duration represents the total viewing time for the Total UE. Each household of the households indicated in the determination/calculation of Equation 1(a) and Equation 1(b) may be represented by a content output device of a general population of content output devices. Similarly, the viewing time of each households of the households indicated in the determination/calculation of Equation 2(a) and Equation 2(b) may be represented by viewing time of a content output device of a general population of content output devices.

For example, for the basketball game airing on a sports television channel during a Sunday daytime daypart, the index parameter calculated by Equation 1(a) may represent a ratio of (i) the percentage of devices clustered into the sports enthusiast subset that are outputting the basketball game at Sunday daytime of all devices into the sports enthusiast subset to (ii) the percentage of devices that output the basketball game at Sunday daytime of all device that are outputting television content.

For example, the weighted index parameter may be calculated by Equation 2(a) and Equation 2(b):

$$\left[\sum_{i=1}^{n} W_i \left(\frac{HHID \text{ Segment Size}_i}{\text{Total Segment } UE_i}\right)\right] \div \left(\frac{HHID \text{ Size}}{\text{Total } UE}\right) \quad \text{Equation 2(a)}$$

$$\left[\sum_{i=1}^{n} W_i \left(\frac{HHID \text{ Segment Size}_i}{\text{Total Segment } UE_i}\right)\right] \div \quad \text{Equation 2(b)}$$

$$\left(\frac{HHID \text{ Size Viewing Duration}}{\text{Total } UE \text{ Viewing Duration}}\right)$$

wherein $\Sigma_{i=1}^{n} W_i$ representing a respective subset/cluster weight applied to each subset generated by the clustering algorithm (e.g., medium viewer subset and heavy viewer subset), HHID Segment Size represents a quantity of households of a specific audience segment subset that tune in to a television network broadcast for a particular network daypart combination, Total Segment UE represents a total number of households of the specific audience segment subset that tune into television network broadcasts across all possible network daypart combinations, HHID Size represents all households that tune into the television network broadcast for a particular network daypart combination, HHID Size Viewing Duration represents the total viewing time for the HHID Size, Total UE represents all households across all television network broadcasts and dayparts, and Total UE Viewing Duration represents the total viewing time for the Total UE.

Each household of the households indicated in the determination/calculation of Equation 2(a) and Equation 2(b) may be represented by a content output device of a general population of content output devices. The $W_i$ may be determined based on an average distance from each point clustered into subset i with respect to the center point of a subset of interest of the subsets determined by the clustering algorithm. The $W_i$ may be applied to the numerator of Equation 2(a)) and Equation 2(b) for each subset determined by the clustering algorithm. For example, the $W_i$ for the weighting model 400 may include a subset/cluster weight for a medium viewer subset and a heavy viewer subset, such as 67% for the medium viewer subset and 33% for the heavy viewer subset. The weights may be determined based on the determination/calculations of the weighting model 400. For example, the number of accounts indicated by the weighting model 400 may represent the quantity of households or content output devices that are clustered into a medium viewer of reality television channels subset and a heavy viewer of reality television channels subset. For example, the quantity of devices clustered into the medium viewer of reality television channels subset may be 593,000 accounts while the quantity of devices clustered into the heavy viewer of reality television channels subset may be 121,000 accounts.

The relative percentage of accounts of the two subsets may be calculated such as by taking the quantity of accounts for each subset and dividing by the total number of accounts (714,000). For example, the medium viewer of reality television channels subset may account for 80% of the accounts, based on rounding down the percentage. The heavy viewer of reality television channels subset may account for 20% of the accounts, based on rounding down the percentage. In the next column of the weighting model 400, an average distance to one of the determined subsets/clusters may be determined. For example, the average distance to heavy viewer of reality television channels subset may be determined because a potential purchaser of an advertising slot that desires to target the reality television channel audience subset may be most interested in devices clustered into the heavy viewer of reality television channels subset. For example, the average distance may refer to a Euclidean distance to a center point of the heavy viewer of reality television channels subset. The center point may be a midpoint of the cluster representing the heavy viewer of reality television channels subset, such as the Euclidean center of all points clustered into the heavy viewer of reality television channels subset (e.g. heavy subset 306). For example, the average distance for the medium viewer of reality television channels subset to the center point of the heavy viewer of reality television channels subset may be 4.7.

For example, the average distance for the heavy viewer of reality television channels subset to the center point of the heavy viewer of reality television channels subset may be 1.9. If the average distance for the medium viewer of reality television channels subset is relatively high, then the weight assigned (e.g., in the determination/calculation of the weighted index parameter) to the medium viewer of reality television channels subset may be correspondingly lower. If the average distance for the medium viewer of reality television channels subset is relatively low, then the weight assigned to the medium viewer of reality television channels subset may be correspondingly lower. If the average distance for the heavy viewer of reality television channels subset is relatively high, then the weight assigned to the medium viewer of reality television channels subset may be correspondingly higher. If the average distance for the heavy viewer of reality television channels subset is relatively lower, then the weight assigned to the medium viewer of reality television channels subset may be correspondingly lower. This way, a particular content and daypart combination may be ranked higher on a list ranked by determined weighted index parameter if a greater proportion of relatively "heavier" (e.g., heavy viewers that view content relatively more than an average heavy viewer or medium viewers that view content relatively less than the average heavy viewer) viewers are expected to view content output on their devices during the particular content and daypart combination.

The particular content and daypart combination may be ranked lower on the list ranked by determined weighted index parameter if a lesser proportion of relatively "heavier" are expected to view. The weighting model 400 indicates that an inverse of the calculated Euclidean average distance value may be calculated. The inverse may enable the average distance from center point value to be scaled on a 100% scale to facilitate determination/calculation of the cluster/subset weights used in the weighted index parameter determination/calculation. As indicated by the weighting model 400, the inverse of the average distance for the medium viewer of reality television channels subset may be 0.21 and the inverse average distance for the heavy viewer of reality television channels subset may be 0.52. As shown by the next column of the weighting model 400, a percentage of each inverse average distance value to the total average distance values may be calculated. For example, the inverse average distance percentage of the medium viewer of reality television channels subset may be 30%. For example, the inverse average distance percentage of the heavy viewer of reality television channels subset may be 70%. The inverse average weights may be used to reweigh the number of accounts. For example and including rounding error into the determination/calculation, the 593,000 accounts reweighted by inverse distance may yield 174,000 accounts or devices in the medium viewer of reality television channels subset while the 121,000 accounts reweighted by inverse distance may yield 86,000 accounts or devices in the heavy viewer of reality television channels subset.

As indicated by the weighting model 400, accounts reweighted by inverse distance may be used to determine the subset/cluster weights $W_i$ (i being an index value of the subsets/clusters of interest) used in the reweighted index parameter of Equation 2(a) and Equation 2(b). For example, the proportion of 174,000 reweighted accounts to the total of 260,000 may yield a final subset/cluster weight of 67%. For example, the proportion of 86,000 reweighted accounts to the total of 260,000 may yield a final subset/cluster weight of 33%. This way, the numerator and value of Equation 2(a) and Equation 2(b) may be recalculated with weights assigned to clustered subsets based on a level of viewership. Based on different weights assigned to different subsets, the reweighted index parameter calculated by Equation (2) may more accurately reflect how long a duration that viewers view the particular content and daypart combination compared to an average viewer in a subset such as a weighted average viewer of the heavy viewer of reality television channels subset.

FIG. 5 illustrates example results of an example index parameter related to the present methods and systems. The example results may illustrate how a potential purchaser of an advertising spot may better reach target audience subsets with targeted content. The results may be represented a data 500 generated by a computing device (e.g., computing device 204). The data 500 may be a matrix, a list, a spreadsheet, a table, and/or the like. The data 500 may be sent to a potential purchaser of an advertising spot (e.g., via user device 202). Each advertising spot of the advertising spots may be a particular combination of content network, time slot (e.g., content time slot), and/or content program. For example, the first three columns of the data 500 may be indicative of a television network, a week identifier such as week one or week two, and a daypart. For example, the television network may be a reality television network "A" or a reality television network "B." The television networks A and B may each correspond to a television network for which the potential purchaser may be searching for devices/viewers clustered into the medium viewer of reality television channels subset and heavy viewer of reality television channels subset so that those devices/viewers may receive targeted content such as targeted advertisements.

For example, the daypart may be indicated as early morning, daytime, fringe, late fringe, overnight, primetime, and/or the like. In the data 500, EM may indicate early morning, DT may indicate daytime, FR may indicate fringe, LF may indicate late fringe, ON may indicate overnight, and PR may indicate primetime. A reach index and audience index determined via the determination/calculation of the index parameter according to Equation 1(a) and Equation 1(b), respectively, may be shown in the fourth and the fifth column of the data 500. A weighed or clustered reach index and audience index determined via the determination/calculation of the index parameter according to Equation 2(a) and Equation 2(b), respectively, may be shown in the sixth and the seventh column of the data 500.

The reach index, weighted reach index, audience index, and weighted audience index may be determined for each potential combination of television network, week, and daypart being ranked, as represented by each row of the data 500. For example, Equations 1(a) and 1(b) may be used to determine a reach index and an audience index, respectively, based upon the pooled segment of interest, such as 'Medium' and 'Heavy' clusters combined. Therefore, this equation does not take into account the underlying weights in viewership between the two clusters. Equations 2(a) and 2(b), for example, may be applied to each subset of interest (e.g., 'Medium' viewers, 'Heavy' viewers, etc.) and weights, denoted by $W_i$, may be applied to the individual indices for 'Heavy' viewers and 'Medium' viewers, creating a combined index determination/calculation/determination. For example, in a scenario, the original weight of 'Heavy' viewers may be increased from 20% to 30% (e.g., as shown in FIG. 4). The 'Medium' viewers weight may be decreased from 80% to 70%. Thus, the resulting weighted index determination/calculations (reach and index) may result in higher numbers in comparison to the use of Equations 1(a) and 1(b) for relevant network daypart combinations.

As shown by the data 500, the weighted reach index and weighted audience index may more accurately reflect how much each device in the reality television audience target segment is viewing a respective content and daypart combination compared to how much a general population (e.g., general audience) views the content and daypart combination on average. As such, the weighted reach index and weighted audience index used to determine the weight index parameter may be used to more accurately rank various content and daypart combination listed in the data 500 based on the extent that viewership of the reality television audience target segment exceeds (e.g., to what ratio) viewership of the general audience for the corresponding content and daypart combination.

Figure 6:
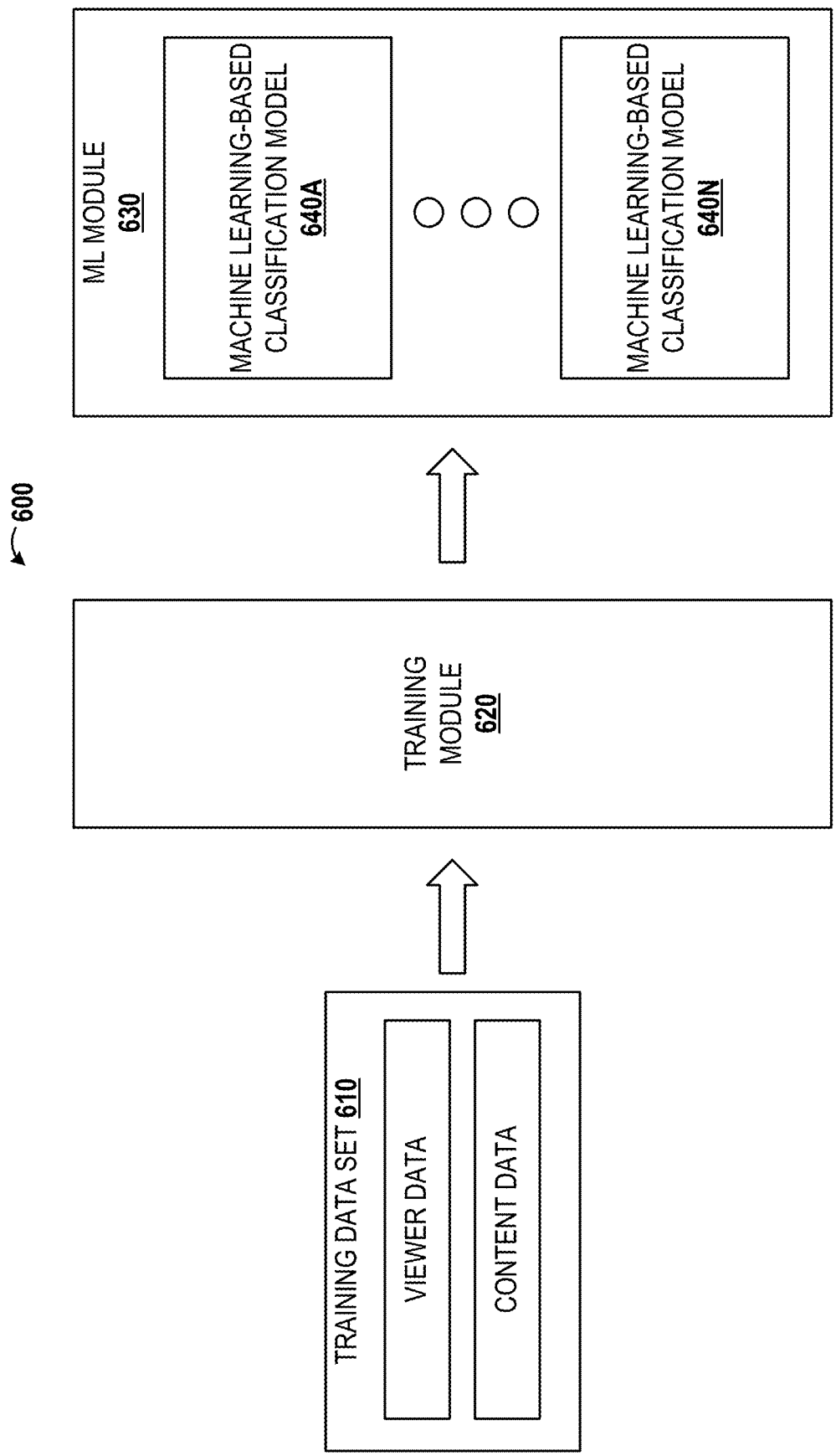
FIG. 6 shows an example method.

Methods are described herein using machine learning for device location such as via generating a predictive model to predict what audience segment or viewing duration category that a device or viewer corresponds to. For example, the predictive model may cluster various devices or viewers based on a level of viewership or propensity to select a particular type of content such as a content network or genre. The methods may be executed via a computing device such as computing device 204 or a suitable device of FIGS. 1-2. FIG. 6 shows a flowchart illustrating an example method 600 for a machine learning algorithm that implements a technique for device location. The methods described herein may use machine learning ("ML") techniques to train, based on an analysis of one or more training data sets 610 by a training module 620 and at least one ML module 630 that is configured to predict what audience segment and viewing duration category that a content output device or viewer should be clustered or classified into.

For example, audience segments may refer to subsets of devices or viewers that are classified based on a propensity to view a specific type of content, such as a horror movie viewer audience subset, cooking enthusiast viewer subset, news television network viewer subset, home improvement television network viewer subset, and/or the like. For example, the at least one ML module 630 may be configured to classify each device or viewer of a general population of device or viewers into a cluster or subset. For example, a clustering algorithm executed by the at least one ML module 630 may be used to determine what cluster or subset should be created. For example, the clustering algorithm may be used to cluster devices into subsets that have already been defined, such as for a potential purchaser of an advertising spot. A user may confirm whether the classification or clustering determined by the at least one ML module 630 is correct. This confirmation may be used to adjust the training data sets 610 and/or the clustering algorithm to increase the prediction or classification accuracy of the at least one ML module 630 increases.

The at least one ML module 630 may predict whether a device should be clustered into a specific subset. For example, the at least one ML module 630 may predict that the device should be clustered into a cooking enthusiast audience segment subset, news viewer audience segment subset, light viewer subset, reality television medium viewer subset, sports enthusiast heavy viewer subset, and/or the like. The device may be clustered into multiple subsets, according to the clustering algorithm executed by the at least one ML module 630. The training module 620 and at least one ML module 630 may be components of or integrated into the computing device 114 or another suitable device of FIGS. 1-5. The classification of one or more training data sets 610 by the training module 620 and the at least one ML module 630 may be used to identify clusters of devices of viewers that are relevant to the potential purchaser of an advertising spot, such as based on viewership and propensity for a content genre.

Analysis of the one or more training data sets 610 by the training module 620 and the at least one ML module 630 may enable determination or identification of specific clusters and weighting based on the determined clusters. For example, classification via the at least one ML module 630 may reflect viewers or devices being grouped based on a propensity to watch a particular genre using viewing duration, content network, genre data, and/or the like. For example, classification via the at least one ML module 630 may reflect viewing duration categories based on a rank parameter (e.g., rank-order) within the determined clusters. A subset of viewership data may be randomly assigned to the training data set 610 or to a testing data set. The assignment of data to a training data set or a testing data set may be random, completely random, or none of the above. Any suitable method or criteria (e.g., a selected clustering algorithm) may be used to assign the data to the training or testing data sets, while ensuring that the distributions of yes and no labels are somewhat similar in the training data set and the testing data set.

The analysis of the training data set 610 may be used to refine the machine learning algorithm and/or change the clustering of devices based on patterns in the viewership data. For example, the patterns may be changed in historic viewership relative to particular types of content. The viewership data may be viewership duration data, content genre data, content network data, content program data, content title data, and/or the like.

The data of the training data set 610 may be determined based on metadata in a database such as the database 208. The viewership data may be gathered and determined via a content distribution network, such as the system 100. The training data set 610 may be provided to the training module 620 for analysis and for determination of a feature set. The feature set may comprise viewership duration, genre, network, program, and title for determination of clusters or subsets. The feature set may be determined by the training module 620 via the ML module 630. For example, the training module 620 may train the ML module 630 by extracting the feature set from viewership data (e.g., labeled as yes) and/or other viewership data (e.g., labeled as no) in the training data set 610 according to one or more feature selection techniques.

The training module 620 may train the ML module 630 by extracting a feature set from the training data set 610 that includes statistically significant features of positive examples (e.g., labeled as being yes) and statistically significant features of negative examples (e.g., labeled as being no). The training module 620 may extract a feature set from the training data set 610 in a variety of ways. The training module 620 may perform feature extraction multiple times, each time using a different feature-extraction technique. For example, the feature sets generated using the different techniques may each be used to generate different machine learning-based classification models 640. For example, the feature set with the highest quality metrics may be selected for use in training.

The training module 620 may use the feature set(s) to build one or more machine learning-based classification models 640A-640N that are configured to indicate whether a portion of the residence 200 corresponding to sensing signature(s) and/or feedback data is a candidate or suggested point for portion of the residence 200 to search for the lost remote control 502. The one or more machine learning-based classification models 640A-640N may also be configured to indicate clusters, subsets, level of viewership categories, categories of propensity to select a particular type of content, and/or the like. Specific features of the feature set may have different relative significance in predicting clusters or subsets.

The training data set 610 may be analyzed to determine any dependencies, associations, and/or correlations between features and the yes/no labels in the training data set 610. The identified correlations may have the form of a list of features that are associated with different yes/no labels. The term "feature," as used herein, may refer to any characteristic of an item of data that may be used to determine whether the item of data falls within one or more specific categories. For example, the features described herein may comprise viewing duration, content propensity, content type data, and/or the like. A feature selection technique may comprise one or more feature selection rules. The one or more feature selection rules may comprise a feature occurrence rule. The feature occurrence rule may comprise determining which features in the training data set 610 occur over a threshold number of times and identifying those features that satisfy the threshold as features.

A single feature selection rule may be applied to select features or multiple feature selection rules may be applied to select features. The feature selection rules may be applied in a cascading fashion, with the feature selection rules being applied in a specific order and applied to the results of the previous rule. For example, the feature occurrence rule may be applied to the training data set 610 to generate a first list of features. A final list of features may be analyzed according to additional feature selection techniques to determine one or more feature groups (e.g., groups of features that may be used to predict clusters or subsets). Any suitable computational technique may be used to identify the feature groups using any feature selection technique such as filter, wrapper, and/or embedded methods. One or more feature groups may be selected according to a filter method. Filter methods include, for example, Pearson's correlation, linear discriminant analysis, analysis of variance (ANOVA), chi-square, combinations thereof, and/or the like. The selection of features according to filter methods are independent of any machine learning algorithms. Instead, features may be selected on the basis of scores in various statistical tests for their correlation with the outcome variable (e.g., yes/no).

As another example, one or more feature groups may be selected according to a wrapper method. A wrapper method may be configured to use a subset of features and train a machine learning model using the subset of features. Based on the inferences that drawn from a previous model, features may be added and/or deleted from the subset. Wrapper methods include, for example, forward feature selection, backward feature elimination, recursive feature elimination, combinations thereof, and the like. For example, forward feature selection may be used to identify one or more feature groups. Forward feature selection is an iterative method that begins with no feature in the machine learning model. In each iteration, the feature which best improves the model is added until an addition of a new variable does not improve the performance of the machine learning model.

For example, backward elimination may be used to identify one or more feature groups. Backward elimination is an iterative method that begins with all features in the machine learning model. In each iteration, the least significant feature is removed until no improvement is observed on removal of features. Recursive feature elimination may be used to identify one or more feature groups. Recursive feature elimination is a greedy optimization algorithm which aims to find the best performing feature subset. Recursive feature elimination repeatedly creates models and keeps aside the best or the worst performing feature at each iteration. Recursive feature elimination constructs the next model with the features remaining until all the features are exhausted. Recursive feature elimination then ranks the features based on the order of their elimination.

As a further example, one or more feature groups may be selected according to an embedded method. Embedded methods combine the qualities of filter and wrapper methods. Embedded methods include, for example, Least Absolute Shrinkage and Selection Operator (LASSO) and ridge regression which implement penalization functions to reduce overfitting. For example, LASSO regression performs L1 regularization which adds a penalty equivalent to absolute value of the magnitude of coefficients and ridge regression performs L2 regularization which adds a penalty equivalent to square of the magnitude of coefficients.

After the training module 620 has generated a feature set(s), the training module 820 may generate a machine learning-based classification model 640 based on the feature set(s). A machine learning-based classification model may refer to a complex mathematical model for data classification that is generated using machine-learning techniques. In one example, the machine learning-based classification model 640 may include a map of support vectors that represent boundary features. By way of example, boundary features may be selected from, and/or represent the highest-ranked features in, a feature set. The machine learning-based classification model 640 may be a supervised machine learning model based on a plurality of classifiers provided by a plurality of users.

The training module 620 may use the feature sets determined or extracted from the training data set 610 to build a machine learning-based classification model 640A-640N for each classification category (e.g., yes, no). In some examples, the machine learning-based classification models 640A-640N may be combined into a single machine learning-based classification model 640. Similarly, the ML module 630 may represent a single classifier containing a single or a plurality of machine learning-based classification models 640 and/or multiple classifiers containing a single or a plurality of machine learning-based classification models 640. A classifier may be provided by a user according to user configuration settings, such as settings related to an activated function of the remote control 502 and a type of feedback data and/or sensing signature.

The features may be combined in a classification model trained using a machine learning approach such as discriminant analysis; decision tree; a nearest neighbor (NN) algorithm (e.g., k-NN models, replicator NN models, etc.); statistical algorithm (e.g., Bayesian networks, etc.); clustering algorithm (e.g., k-means, mean-shift, hierarchal, agglomerative, model-based, etc.); neural networks (e.g., reservoir networks, artificial neural networks, etc.); support vector machines (SVMs); logistic regression algorithms; linear regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; a combination thereof and/or the like. The resulting ML module 630 may comprise a decision rule or a mapping for each feature to assign trick mode automation status.

In an embodiment, the training module 620 may train the machine learning-based classification models 640 as a convolutional neural network (CNN). The CNN comprises at least one convolutional feature layer and three fully connected layers leading to a final classification layer (softmax). The final classification layer may finally be applied to combine the outputs of the fully connected layers using softmax functions as is known in the art.

The feature(s) and the ML module 630 may be used to predict clusters or subsets. For example, the prediction result for each device includes a subset or cluster that the device should be clustered into. The predicted clusters or subsets may be based on viewership duration and/or propensity to view a type of content. The prediction result may have a confidence level that corresponds to a likelihood or a probability the each device is classified accurately. The confidence level may be a value between zero and one. For example, when there are two statuses (e.g., yes and no), the confidence level may correspond to a value p, which refers to a likelihood that a particular device belongs to the first status (e.g., yes). In this case, the value 1-p may refer to a likelihood that the device belongs to the second status (e.g., no). In general, multiple confidence levels may be provided for each particular instance of feedback or sensing signature in the testing data set and for each feature when there are more than two statuses.

A top performing feature may be determined by comparing the result obtained for each device with the known yes/no status. In general, the top performing feature will have results that closely match the known historically accurate clustering. The top performing feature(s) may be used to predict additional patterns or indications of features used to accurately cluster devices. For example, a new correlation between viewership data and clusters may be determined.

The new correlation may be provided to the ML module 630 which may, based on the top performing feature(s), improve device clustering as either a candidate device for a cluster/subset (yes) or not a candidate device for a cluster/subset (no).

Figure 7:
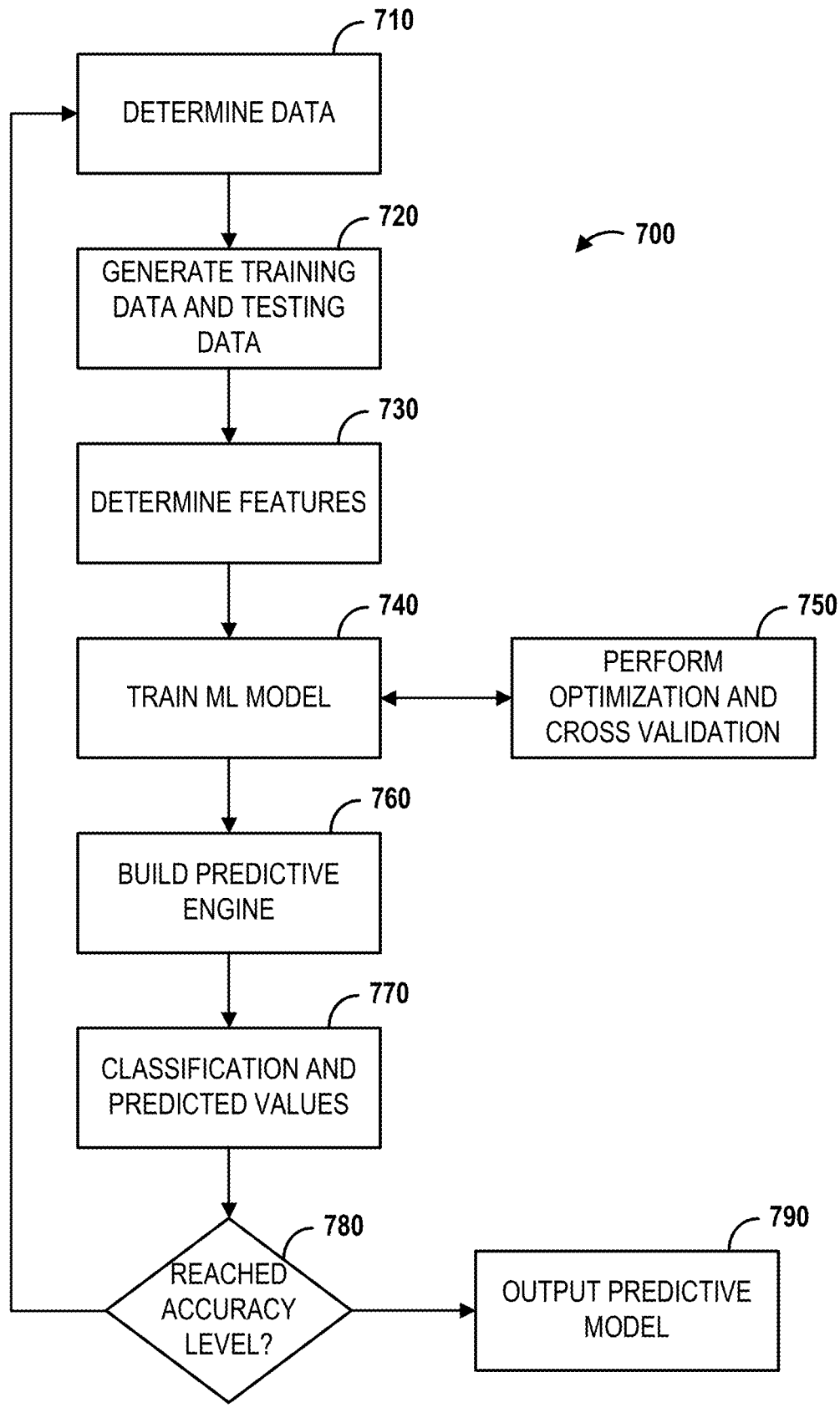
FIG. 7 shows example features of a predictive model.

FIG. 7 is a flowchart illustrating an example training method 700 for generating the ML module 630 using the training module 620. The training module 620 may implement supervised, unsupervised, and/or semi-supervised (e.g., reinforcement based) machine learning-based classification models 640. The method 700 illustrated in FIG. 7 is an example of a supervised learning method; variations of this example of training method are discussed below, however, other training methods may be analogously implemented to train unsupervised and/or semi-supervised machine learning models. The training method 700 may determine (e.g., access, receive, retrieve, etc.) viewership data associated with a cluster or subset at step 710. The viewership data may comprise viewership duration data, content genre data, content network data, content program data, content title data, and/or the like. The labels may correspond to candidate location status (e.g., yes or no) if the label corresponds to an audience subset or viewing duration subset that a device is a candidate for.

The training method 700 may generate, at step 720, a training data set and a testing data set. The training data set and the testing data set may be generated by randomly assigning labeled sets of viewership data to either the training data set or the testing data set. In some implementations, the assignment of labeled sets of viewership data as training or testing data may not be completely random. For example, a majority of the labeled set of viewership data may be used to generate the training data set. For example, 75% of the labeled set of viewership data may be used to generate the training data set and 25% may be used to generate the testing data set. In another example, 80% of the labeled set of viewership data may be used to generate the training data set and 20% may be used to generate the testing data set.

The training method 700 may determine (e.g., extract, select, etc.), at step 730, one or more features that may be used by, for example, a classifier to differentiate among different clusters or subsets (e.g., yes vs. no). For example, the training method 700 may determine a set of features from the labeled set of viewership data. For example, a set of features may be determined from a labeled set of viewership data that is different than the labeled set of viewership data in either the training data set or the testing data set. In other words, the labeled set of viewership data may be used for feature determination, rather than for training a machine learning model. Such labeled set of viewership data may be used to determine an initial set of features, which may be further reduced using the training data set. For example, the features described herein may comprise viewing duration, content propensity, content type data, and/or the like.

The training method 700 may train one or more machine learning models using the one or more features at step 740. In one example, the machine learning models may be trained using supervised learning. In another example, other machine learning techniques may be employed, including unsupervised learning and semi-supervised. The machine learning models trained at 740 may be selected based on different criteria depending on the problem to be solved and/or data available in the training data set. For example, machine learning classifiers may suffer from different degrees of bias. Accordingly, more than one machine learning model may be trained at 740, optimized, improved, and cross-validated at step 750.

The training method 700 may select one or more machine learning models to build a predictive model at 760. The predictive model may be evaluated using the testing data set. The predictive model may analyze the testing data set and generate predicted subsets or clusters corresponding to the viewership data of the testing data set at step 770. Predicted subsets or clusters may be evaluated at step 780 to determine whether such subset or cluster classification have achieved a desired accuracy level. Performance of the predictive model may be evaluated in a number of ways based on a number of true positives, false positives, true negatives, and/or false negatives classifications of the feedback data and sensing signature data indicated by the predictive model.

For example, the false positives of the predictive model may refer to a number of times the predictive model incorrectly classified devices as indicative of an audience segment cluster or viewing duration cluster that was in reality not a correct cluster for the classified device. Conversely, the false negatives of the predictive model may refer to a number of times the machine learning model classified devices as not indicative of an audience segment cluster or viewing duration cluster when, in fact, the cluster was a correct cluster for the classified device. True negatives and true positives may refer to a number of times the predictive model correctly classified a device as being in a particular cluster or subset. Related to these measurements are the concepts of recall and precision. Generally, recall refers to a ratio of true positives to a sum of true positives and false negatives, which quantifies a sensitivity of the predictive model. Similarly, precision refers to a ratio of true positives a sum of true and false positives. When such a desired accuracy level is reached, the training phase ends and the predictive model (e.g., the ML module 630) may be output at step 790; when the desired accuracy level is not reached, however, then a subsequent iteration of the training method 700 may be performed starting at step 710 with variations such as, for example, considering a larger collection of viewership data.

Figure 8:
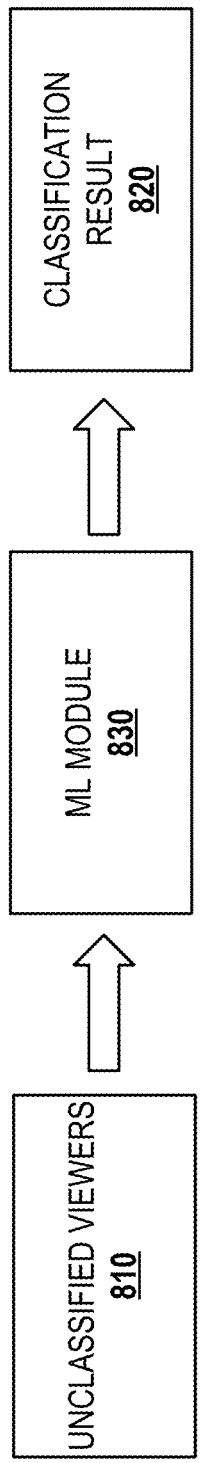
FIG. 8 shows an example method.

FIG. 8 is an illustration of an exemplary process flow for using a machine learning-based classifier to determine whether a device should be clustered into a particular cluster corresponding to an audience segment subset or viewing duration subset. As illustrated in FIG. 8, unclassified viewers or devices 810 may be provided as input to the ML module 830. The ML module 830 may process the unclassified viewers 810 using a machine learning-based classifier(s) such as a k-means clustering algorithm to arrive at a classification result 820. The classification result 820 may identify one or more characteristics of the unclassified viewers 810, such as a viewing duration or propensity to view a genre of content. The classification result 820 may identify, for unclassified viewers 810, a cluster or subset (e.g., audience segment subset, viewing duration subset, or combination thereof) that the unclassified viewers 810 should be clustered into.

The ML module 830 may be used to classify, for instances of the feedback data 810, as corresponding to a place or object provided by an analytical model. A predictive model (e.g., the ML module 830) may serve as a quality control mechanism for the analytical model. Before unclassified viewers 810 provided by the analytical model is tested in an experimental setting, the predictive model may be used to test if the provided unclassified viewers 810 would be predicted to be positive for a determined cluster. In other words, the predictive model may suggest or recommend a subset such as an audience segment subset, viewing duration subset, or combination thereof that the unclassified viewers 810 should be clustered into.

Figure 9:
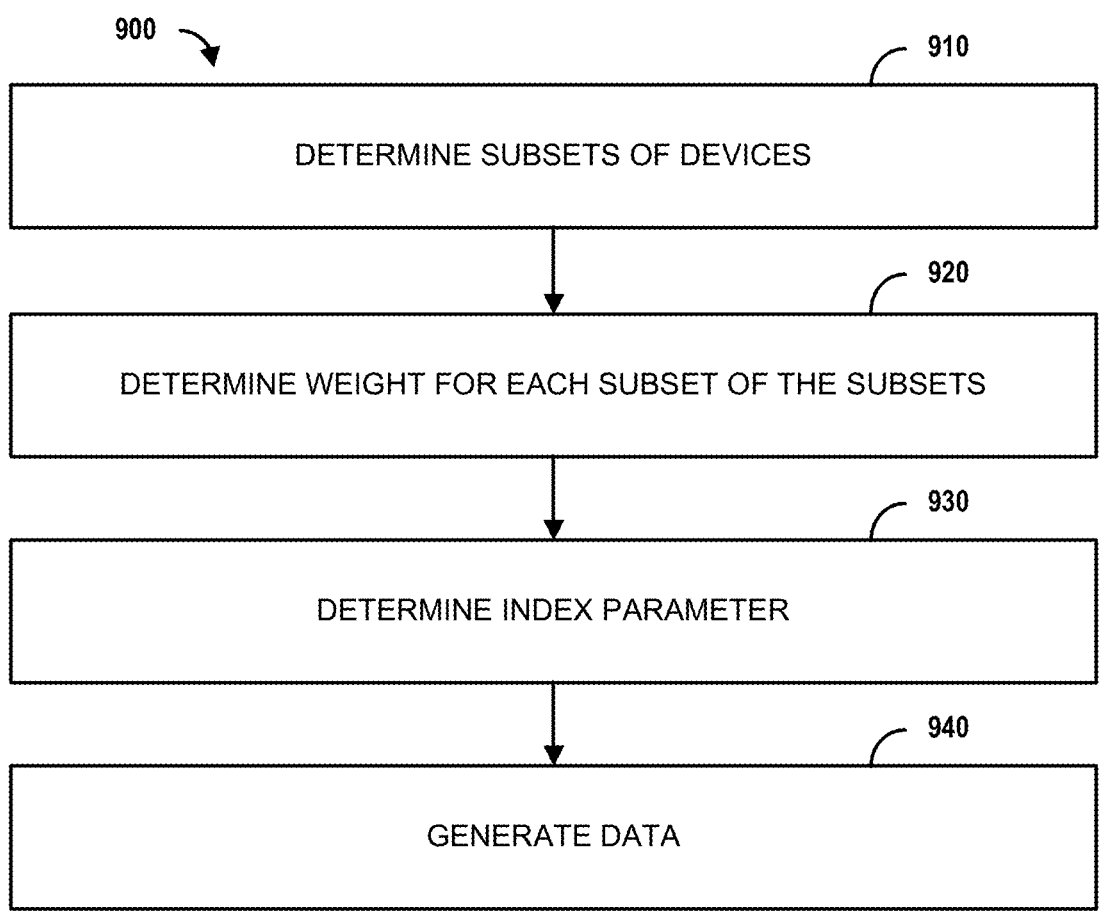
FIG. 9 shows a flowchart of an example method.

FIG. 9 shows a flowchart illustrating an example method 900 for audience metric determination. The method 900 may be implemented using the devices shown in FIGS. 1-5. For example, the method 900 may be implemented using a device such as the computing device 204 or other suitable device. At step 910, a computing device may determine a plurality of subsets of devices. The plurality of subsets may be determined based on clustering the devices. Each subset of the plurality of subsets of the devices may be associated with a quantity of time to output content. The devices may comprise devices associated with at least one of: output of content, selection of a content type, or content viewership. For example, the computing device may determine at least one subset threshold. The plurality of subsets may comprise a first subset associated with a first quantity of output content that is above the at least one subset threshold, a second subset associated with a second quantity of output content that is below the at least one subset threshold, and a third subset associated with a third quantity of output content that is below the second quantity of output content. For example, the computing device may determine the plurality of subsets of devices to cluster the devices. The devices may be clustered based on audience type and viewership data.

The audience type may comprise at least one of: a genre audience type, a sports content audience type, a cooking content audience type, a chronological age range audience type, a content network audience type, or a content program audience type. For example, the computing device may determine a first portion of the devices in a first subset and a second portion of the devices in a second subset. The first portion and the second portion may be determined based on at least one subset threshold. At step 920, the computing device may determine a weight. The weight may be determined for each subset of the plurality of subsets of the devices. The weight for each subset of the plurality of subsets of the devices may be determined based on a distance associated each subset of the plurality of subsets. For example, the distance may comprise an average distance of each subset of the plurality of subsets and a center point of a subset of the plurality of subsets of the devices. For example, the computing device may determine a first average distance of each device in a first subset to a midpoint of the first subset and determine a second average distance of each device in a second subset to a midpoint of the first subset.

At step 930, the computing device may determine an index parameter indicative of a of a propensity of a device of the devices to output the type of content. The index parameter may be determined based on each weight for each subset of the plurality of subsets of the devices. For example, the propensity of the device to output the type of content may be associated with at least one of: a quantity of devices of the subset that output a type of content item during a content time slot of the plurality of content time slots or a likelihood that a device of the devices that outputs the type of content item during the content time slot is clustered into the subset. For example, the computing device may determine a ratio of a portion of the devices that output a type of content item and the devices that output the type of content item during the plurality of content time slots. For example, the computing device may apply, to corresponding index values, the weight for each subset of the plurality of subsets.

The portion of the devices may correspond to a target device subset. At step 940, the computing device may generate data indicative of a plurality of content time slots. The data may be generated based on the index parameter. For example, the computing device may generate the data such that the computing device may determine, based on the index parameter, a ranking of the plurality of content time slots. The ranking of the plurality of content time slots may comprise a highest ranked content time slot. For example, the computing device may generate the data to generate a matrix indicative of at least one of: a plurality of content items or a plurality of content channels being output during a plurality of content time slots. For example, the computing device may determine a daypart classification of the plurality of content time slots. The daypart classification may comprise at least one of early morning, daytime, fringe, late fringe, overnight, or primetime.

Figure 10:
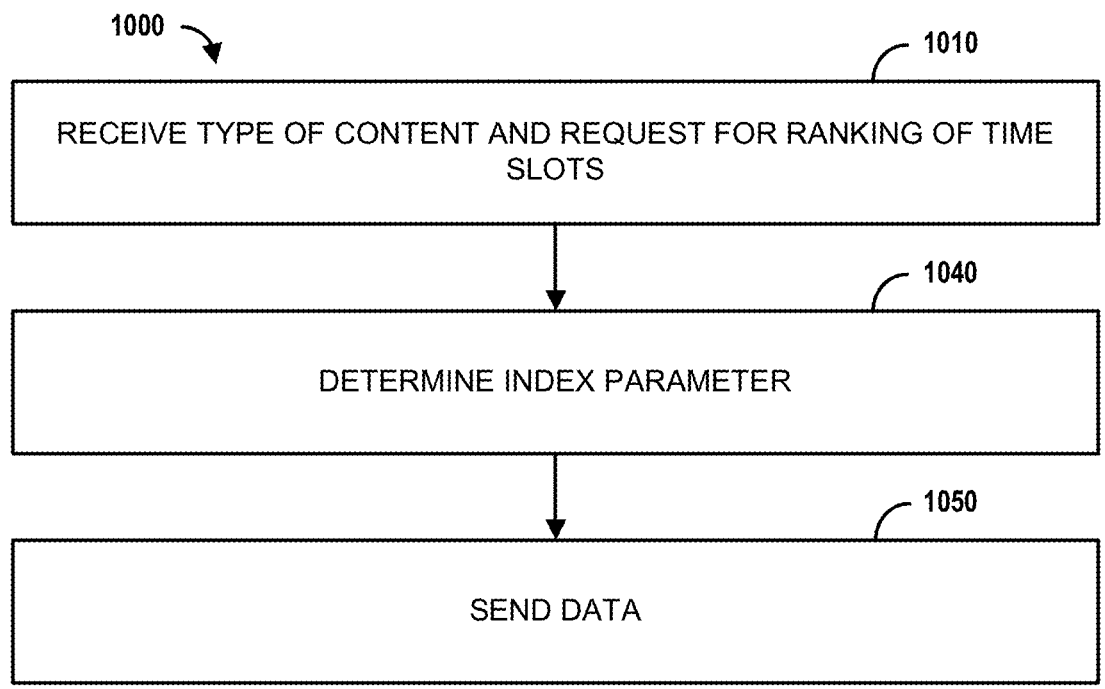
FIG. 10 shows a flowchart of an example method.

FIG. 10 shows a flowchart illustrating an example method 1000 for audience metric determination. The method 1000 may be implemented using the devices shown in FIGS. 1-5. For example, the method 1000 may be implemented using a device such as the computing device 204 or other suitable device. At step 1010, a computing device may receive a type of content and a request for a ranking of a plurality of time slots. For example, the computing device may receive the request such that the computing device may receive, from a user device, a target device subset corresponding to the type of content. The type of content may comprise at least one of: a sports content item, an drama content item, a content item for a chronological age range, a genre content item, or a content item title. For example, the computing device may receive, from a user device, an indication of a plurality of subsets of the devices. The plurality of subsets of the devices may comprise a first subset associated with a first quantity of output content that is above at least one subset threshold, a second subset associated with a second quantity of output content that is below the at least one subset threshold, and a third subset associated with a third quantity of output content that is below the second quantity of output content.

At step 1020, the computing device may determine an index parameter indicative of a propensity of a device of the devices to output the type of content. The index parameter may be determined based on a weight for each device of a subset of a plurality of subsets of devices. For example, the computing device may apply, to corresponding index values, the weight for each subset of the plurality of subsets. The weight may be based on a distance associated with each subset of the plurality of subsets. For example, the computing device may determine a ratio of a portion of the devices associated with the propensity to output the type of content and a quantity of the devices. For example, the devices may be associated with at least one of: output of content, selection of a content type, or content viewership. For example, the computing device may cluster, based on viewership data, a portion of the devices to a target device subset of a plurality of target device subsets. For example, the computing device may determine the weight for each subset of the plurality of subsets of the devices based on an average difference between content output times of devices in each subset and a midpoint of a subset of the plurality of subsets. The midpoint may comprise a weighted average content output time of the subset. For example, the computing device may determine, based on clustering devices according to a clustering algorithm, a plurality of subsets of the devices.

At step 1030, the computing device may send data indicative of a plurality of content time slots. For example, the data may be sent based on the index parameter. For example, the computing device may send based on the type of content, at least one of: a matrix, a list, a spreadsheet, or a table. For example, the computing device may send an indication of a highest ranked content time slot of the plurality of content time slots. For example, each content time slot of the plurality of content time slots may define a time period and a type of content source.

Figure 11:
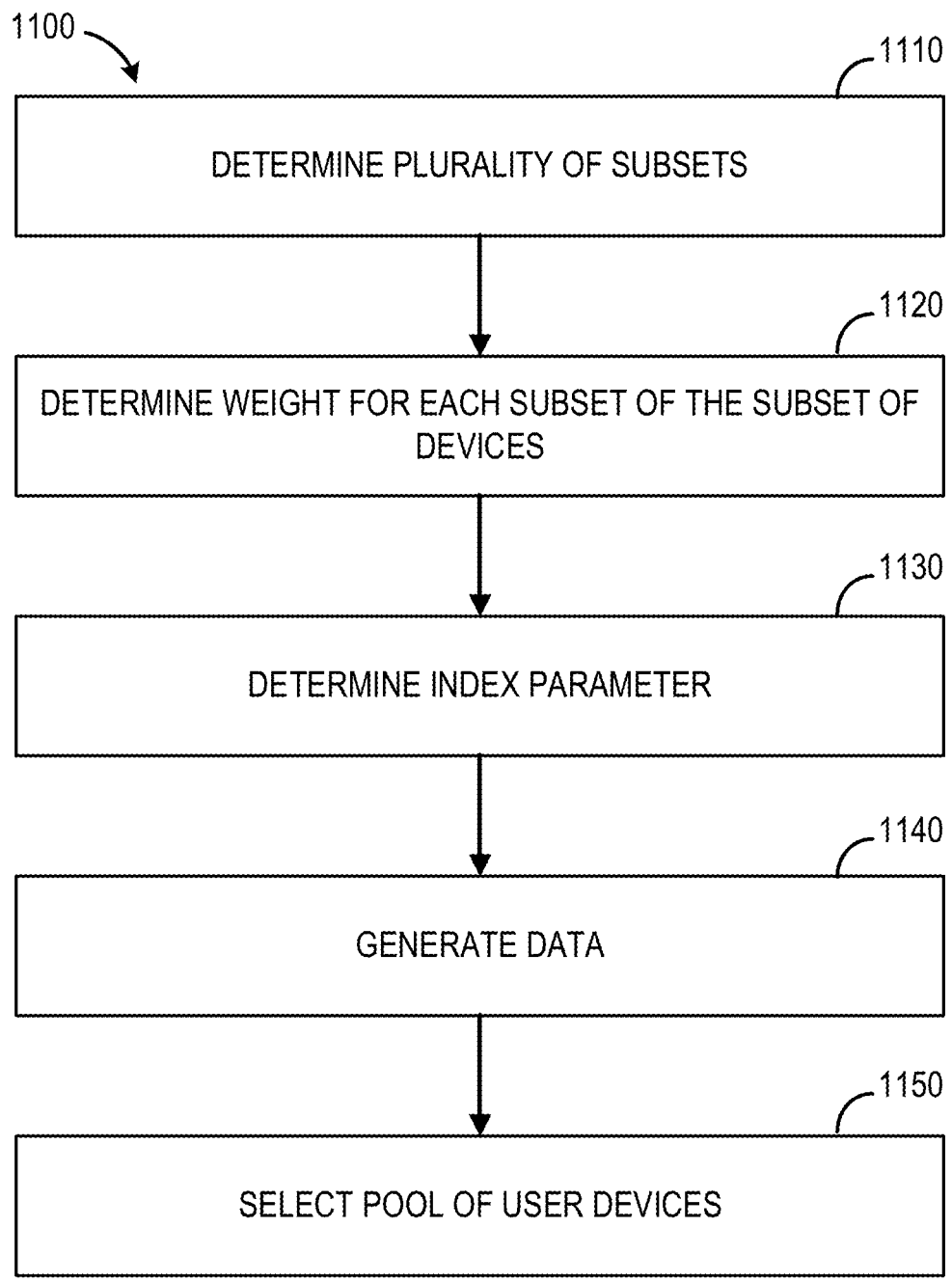
FIG. 11 shows a flowchart of an example method.

FIG. 11 shows a flowchart illustrating an example method 1100 for audience metric determination. The method 1100 may be implemented using the devices shown in FIGS. 1-5. For example, the method 1100 may be implemented using a device such as the computing device 204 or other suitable device. At step 1110, a computing device may determine a plurality of subsets of devices. The plurality of subsets may be determined based on clustering the devices. For example, each subset of the plurality of subsets of the devices may be associated with a quantity of time associated with output of a type of content. For example, the computing device may apply a k-means clustering algorithm based on at least one of: a level of viewership, a type of content genre, a type of content network, a type of content program, or a type of content title. For example, the computing device may determine at least one subset threshold. The plurality of subsets may comprise a first subset associated with a first quantity of output content that is above the at least one subset threshold, a second subset associated with a second quantity of output content that is below the at least one subset threshold, and a third subset associated with a third quantity of output content that is below the second quantity of output content. For example, the computing device may cluster, based on audience type, the devices. The audience type may comprise at least one of: a genre audience type, a sports content audience type, a cooking content audience type, a chronological age range audience type, a content network audience type, or a content program audience type.

At step 1120, the computing device may determine a weight. The weight may be determined for each subset of the plurality of subsets of the devices. The weight for each subset of the plurality of subsets of the devices may be determined based on a distance associated with each subset of the plurality of subsets. For example, the computing device may determine a first average distance of points of a first subset of the plurality of subsets to the midpoint and determine a second average distance of points of a second subset of the plurality of subsets to the midpoint. The midpoint may comprise a midpoint of the first subset. At step 1130, the computing device may determine an index parameter indicative of a propensity of a device of the devices to output the type of content. The index parameter may be determined based on each weight for each subset of the plurality of subsets of the devices. For example, the computing device may apply, to corresponding index values, the weight for each subset of the plurality of subsets.

For example, the computing device may determine a ratio of a portion of the devices associated with the propensity to output the type of content and a quantity of the devices. The portion of the device may be associated with viewership of a target device subset during a content time slot. The quantity of the devices may be associated with viewership by a general audience during the content time slot. At step 1140, the computing device may generate data indicative of a ranking of a plurality of content networks. The data may be generated based on the index parameter. For example, the computing device may generate at least one of: a matrix, a list, a spreadsheet, or a table. For example, the computing device may generate an indication of a content network of the plurality of content networks during a content time slot. The content time slot may comprise at least one of: early morning, daytime, fringe, late fringe, overnight, or primetime. For example, the computing device may determine a highest ranked content network of the plurality of content networks. At step 1150, the computing device may select a pool of devices based on the data indicative of the plurality of content time slots. The pool of devices may be limited to a quantity of devices from each subset of the plurality of subsets of devices. For example, the computing device may send targeted content to one or more devices selected from the pool of devices.

Figure 12:
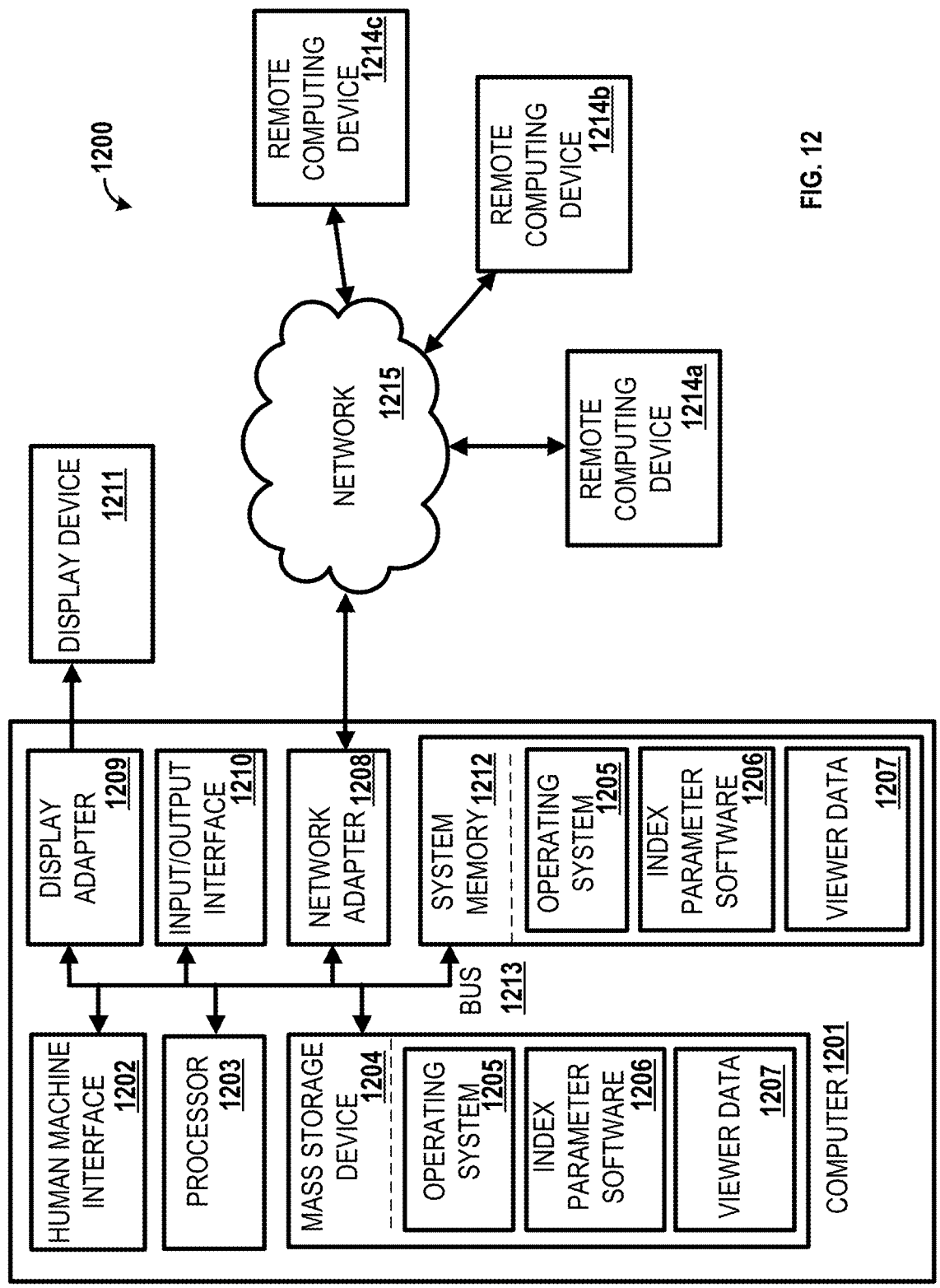
FIG. 12 shows a block diagram of an example computing device in which the present methods and systems may operate.

The methods and systems may be implemented on a computer 1201 as illustrated in FIG. 12 and described below. Similarly, the methods and systems disclosed may utilize one or more computers to perform one or more functions in one or more locations. FIG. 12 shows a block diagram illustrating an exemplary operating environment 1200 for performing the disclosed methods. This exemplary operating environment 1200 is only an example of an operating environment and is not intended to suggest any limitation as to the scope of use or functionality of operating environment architecture. Neither should the operating environment 1200 be interpreted as having any dependency or requirement relating to any one or combination of components illustrated in the exemplary operating environment 1200.

The present methods and systems may be operational with numerous other general purpose or special purpose computing system environments or configurations. Examples of well-known computing systems, environments, and/or configurations that may be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems may be performed by software components. The disclosed systems and methods may be described in the general context of computer-executable instructions, such as program modules, being executed by one or more computers or other devices. Generally, program modules comprise computer code, routines, programs, objects, components, data structures, and/or the like that perform particular tasks or implement particular abstract data types. The disclosed methods may also be practiced in grid-based and distributed computing environments where tasks are performed by remote processing devices that are linked through a communications network. In a distributed computing environment, program modules may be located in local and/or remote computer storage media including memory storage devices.

The user device 102, the computing device 114, the remote control 302, 402, 502 and/or other devices shown in FIGS. 1-5 may be or include a computer 1201 as shown in the block diagram 1200 of FIG. 12. The computer 1201 may include one or more processors 1203, a system memory 1212, and a bus 1213 that couples various system components including the one or more processors 1203 to the system memory 1212. In the case of multiple processors 1203, the computer 1201 may utilize parallel computing. The bus 1213 is one or more of several possible types of bus structures, including a memory bus or memory controller, a peripheral bus, an accelerated graphics port, or local bus using any of a variety of bus architectures.

The computer 1201 may operate on and/or include a variety of computer readable media (e.g., non-transitory). The readable media may be any available media that is accessible by the computer 1201 and may include both volatile and non-volatile media, removable and non-removable media. The system memory 1212 has computer readable media in the form of volatile memory, such as random access memory (RAM), and/or non-volatile memory, such as read only memory (ROM). The system memory 1212 may store data such as the viewer data 1207 and/or program modules such as the operating system 1205 and the index parameter software 1206 that are accessible to and/or are operated on by the one or more processors 1203.

The computer 1201 may also have other removable/non-removable, volatile/non-volatile computer storage media. FIG. 12 shows the mass storage device 1204 which may provide non-volatile storage of computer code, computer readable instructions, data structures, program modules, and other data for the computer 1201. The mass storage device 1204 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and/or the like.

Any quantity of program modules may be stored on the mass storage device 1204, such as the operating system 1205 and the index parameter software 1206. Each of the operating system 1205 and the index parameter software 1206 (or some combination thereof) may include elements of the program modules and the index parameter software 1206. The index parameter software 1206 may include processor executable instructions that cause determining an index parameter. The index parameter may be determined based on a weight for each subset of a plurality of subsets of devices involved in the index parameter determination/calculation. The index parameter software 1206 may include processor executable instructions that cause determining the weight for each subset such as a medium viewer subset and a heavy viewer subset for a target audience subset. The weight may be determined based on an average distance between corresponding points of the medium viewer subset and corresponding points of the heavy viewer subset to a center point of the heavy viewer subset. The viewer data 1207 may be stored on the mass storage device 1204. The viewer data 1207 may comprise at least one of: may include viewership duration data, content genre data, content network data, content program data, content title data, and/or the like. The viewer data 1207 may be stored in any of one or more databases (e.g., database 208) known in the art. Such databases may be DB2®, Microsoft® Access, Microsoft® SQL Server, Oracle®, MySQL, PostgreSQL, and the like. The databases may be centralized or distributed across locations within the network 1215.

A user may enter commands and information into the computer 1201 via an input device (not shown). Examples of such input devices include, but are not limited to, a keyboard, pointing device (e.g., a computer mouse, remote control), a microphone, a joystick, a scanner, tactile input devices such as gloves, and other body coverings, motion sensor, and the like. These and other input devices may be connected to the one or more processors 1203 via a human machine interface 1202 that is coupled to the bus 1213, but may be connected by other interface and bus structures, such as a parallel port, game port, an IEEE 1394 Port (also known as a Firewire port), a serial port, network adapter 1208, and/or a universal serial bus (USB).

The display device 1211 may also be connected to the bus 1213 via an interface, such as the display adapter 1209. It is contemplated that the computer 1201 may include more than one display adapter 1209 and the computer 1201 may include more than one display device 1211. The display device 1211 may be a monitor, an LCD (Liquid Crystal Display), light emitting diode (LED) display, television, smart lens, smart glass, and/or a projector. In addition to the display device 1211, other output peripheral devices may be components such as speakers (not shown) and a printer (not shown) which may be connected to the computer 1201 via the Input/Output Interface 1210. Any step and/or result of the methods may be output (or caused to be output) in any form to an output device. Such output may be any form of visual representation, including, but not limited to, textual, graphical, animation, audio, tactile, and the like. The display device 1211 and computer 1201 may be part of one device, or separate devices.

The computer 1201 may operate in a networked environment using logical connections to one or more remote computing devices 1214a, 1214b, 1214c. A remote computing device may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device, and so on. Logical connections between the computer 1201 and a remote computing device 1214a, 1214b, 1214c may be made via a network 1215, such as a local area network (LAN) and/or a general wide area network (WAN). Such network connections may be through the network adapter 1208. The network adapter 1208 may be implemented in both wired and wireless environments. Such networking environments are conventional and commonplace in dwellings, offices, enterprise-wide computer networks, intranets, and the Internet.

Application programs and other executable program components such as the operating system 1205 are shown herein as discrete blocks, although it is recognized that such programs and components reside at various times in different storage components of the computing device 1201, and are executed by the one or more processors 1203 of the computer. An implementation of the index parameter software 1206 may be stored on or sent across some form of computer readable media. Any of the described methods may be performed by processor-executable instructions embodied on computer readable media.

For purposes of illustration, application programs and other executable program components such as the operating system 1205 are illustrated herein as discrete blocks, although it is recognized that such programs and components may reside at various times in different storage components of the computing device 1201, and are executed by the one or more processors 1203 of the computer 1201. An implementation of index parameter software 1206 may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" may comprise volatile and non-volatile, removable and non-removable media implemented in any methods or technology for storage of information such as computer readable instructions, data structures, program modules, or other data. Exemplary computer storage media may comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

While the methods and systems have been described in connection with specific examples, it is not intended that the scope be limited to the particular embodiments set forth, as the embodiments herein are intended in all respects to be illustrative rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations may be made without departing from the scope or spirit. Other embodiments will be apparent to those skilled in the art from consideration of the specification and practice described herein. It is intended that the specification and examples be considered as exemplary only, with a true scope and spirit being indicated by the following claims.

What is claimed is:

1. A non-transitory computer readable medium storing processor executable instructions that, when executed by at least one processor, cause the at least one processor to:
   determine, based on a quantity of time associated with output of a type of content, a plurality of subsets of a plurality of devices;
   determine, for each subset of the plurality of subsets, based on different levels of viewership associated with each subset of the plurality of subsets, a weight;
   determine, based on the weight for each subset of the plurality of subsets, an index parameter indicative of a likelihood of a device of the subset of the plurality of devices to output the type of content;
   generate, based on the index parameter, data indicative of a plurality of content time slots; and
   select, based on the data indicative of the plurality of content time slots, a pool of the plurality of devices, wherein the selection comprises a quantity of devices from each subset of the plurality of subsets.

2. The non-transitory computer readable medium of claim 1, wherein the processor executable instructions that cause the at least one processor to determine the plurality of subsets further cause the at least one processor to determine at least one subset threshold, wherein the plurality of subsets comprises a first subset associated with a first quantity of output content that is above the at least one subset threshold, a second subset associated with a second quantity of output content that is below the at least one subset threshold, and a third subset associated with a third quantity of output content that is below the second quantity of output content.

3. The non-transitory computer readable medium of claim 1, wherein the processor executable instructions that cause the at least one processor to determine the plurality of subsets further cause the at least one processor to cluster, based on audience type and viewership data, the plurality of devices, wherein the audience type comprises at least one of: a genre audience type, a sports content audience type, a cooking content audience type, a chronological age range audience type, a content network audience type, or a content program audience type.

4. The non-transitory computer readable medium of claim 1, wherein the processor executable instructions that cause the at least one processor to determine the plurality of subsets further cause the at least one processor to determine, based on at least one subset threshold, a first portion of the plurality of devices in a first subset and a second portion of the plurality of devices in a second subset.

5. The non-transitory computer readable medium of claim 1, wherein the processor executable instructions that cause the at least one processor to determine the weight for each subset of the plurality of subsets of the plurality of devices further cause the at least one processor to:
determine a first average distance of each device in a first subset to a midpoint of the first subset; and
determine a second average distance of each device in a second subset to the midpoint of the first subset.

6. The non-transitory computer readable medium of claim 1, wherein the processor executable instructions that cause the at least one processor to determine the index parameter further cause the at least one processor to apply, to corresponding index values, the weight for each subset of the plurality of subsets of the plurality of devices.

7. The non-transitory computer readable medium of claim 1, wherein the processor executable instructions that cause the at least one processor to determine the index parameter further cause the at least one processor to determine a ratio of a portion of the plurality of devices that output the type of content item and the plurality of devices that output the type of content item during the plurality of content time slots, wherein the portion of the plurality of devices correspond to a target device subset.

8. The non-transitory computer readable medium of claim 1, wherein the processor executable instructions that cause the at least one processor to generate the data further cause the at least one processor to determine, based on the index parameter, a ranking of the plurality of content time slots, wherein the ranking of the plurality of content time slots comprises a highest ranked content time slot.

9. The non-transitory computer readable medium of claim 1, wherein the processor executable instructions that cause the at least one processor to generate the data further cause the at least one processor to generate a matrix indicative of at least one of: a plurality of content items or a plurality of content channels being output during the plurality of content time slots.

10. The non-transitory computer readable medium of claim 1, wherein the plurality of devices are associated with at least one of: output of content, selection of a content type, or content viewership.

11. The non-transitory computer readable medium of claim 1, wherein the likelihood of the device to output the type of content is associated with at least one of: a quantity of devices of the subset that output the type of content item during a content time slot of the plurality of content time slots or a likelihood that a device of the quantity of devices that outputs the type of content item during the content time slot is clustered into the subset.

12. The non-transitory computer readable medium of claim 1, wherein the processor executable instructions further cause the at least one processor to determine a daypart classification of the plurality of content time slots, wherein the daypart classification comprises at least one of: early morning, daytime, fringe, late fringe, overnight, or primetime.

13. The non-transitory computer readable medium of claim 1, the processor executable instructions further cause the at least one processor to determine an average distance between points of each subset of the plurality of subsets and a center point of a subset of the plurality of subsets of the plurality of devices.

14. A non-transitory computer readable medium storing processor executable instructions that, when executed by at least one processor, cause the at least one processor to:
receive an indication of a type of content and a request for a ranking of a plurality of content time slots;
determine, based on a weight for each device of a subset of a plurality of subsets of devices, an index parameter indicative of a likelihood of a device of the plurality of subsets of devices to output the type of content; and
send, based on the index parameter, data indicative of the plurality of content time slots.

15. The non-transitory computer readable medium of claim 14, wherein the processor executable instructions that cause the at least one processor to receive the request further cause the at least one processor to receive, from a user device, an indication of a target device subset corresponding to the type of content, wherein the type of content comprises at least one of: a sports content item, an drama content item, a content item for a chronological age range, a genre content item, or a content item title.

16. The non-transitory computer readable medium of claim 14, wherein the processor executable instructions that cause the at least one processor to receive the request further cause the at least one processor to receive, from a user device, an indication of the plurality of subsets of devices, wherein the plurality of subsets of devices comprises: a first subset associated with a first quantity of output content that is above at least one subset threshold, a second subset associated with a second quantity of output content that is below the at least one subset threshold, and a third subset associated with a third quantity of output content that is below the second quantity of output content.

17. The non-transitory computer readable medium of claim 14, wherein the processor executable instructions that cause the at least one processor to determine the index parameter further cause the at least one processor to determine a ratio of a portion of the plurality of subsets of devices associated with the likelihood to output the type of content and a quantity of the plurality of subsets of devices.

18. The non-transitory computer readable medium of claim 14, wherein the processor executable instructions that cause the at least one processor to send the data further cause the at least one processor to send, based on the type of content, at least one of: a matrix, a list, a spreadsheet, or a table.

19. The non-transitory computer readable medium of claim 14, wherein the processor executable instructions that cause the at least one processor to send the data further cause the at least one processor to send an indication of a highest ranked content time slot of the plurality of content time slots.

20. The non-transitory computer readable medium of claim 14, wherein the processor executable instructions that cause the at least one processor to send the data further cause the at least one processor to send an indication of a lowest ranked content time slot of the plurality of content time slots.

21. The non-transitory computer readable medium of claim 14, wherein each content time slot of the plurality of content time slots defines a time period and a type of content source.

22. The non-transitory computer readable medium of claim 14, wherein the plurality of subsets of devices are associated with at least one of: output of content, selection of a content type, or content viewership.

23. The non-transitory computer readable medium of claim 14, wherein the processor executable instructions further cause the at least one processor to cluster, based on viewership data, a portion of the plurality of subsets of devices to a target device subset of a plurality of target device subsets.

24. The non-transitory computer readable medium of claim 14, wherein the processor executable instructions further cause the at least one processor to determine a weight for each subset of the plurality of subsets of devices based on an average difference between content output times of devices in each subset and a midpoint of a subset of the plurality of subsets of devices, wherein the midpoint comprises a weighted average content output time of the subset and the weight is based on a distance associated with each subset of the plurality of subsets of devices.

25. The non-transitory computer readable medium of claim 14, wherein the processor executable instructions further cause the at least one processor to determine, based on clustering devices according to a clustering algorithm, the plurality of subsets of the devices.

26. A non-transitory computer readable medium storing processor executable instructions that, when executed by at least one processor, cause the at least one processor to:
   determine a plurality of subsets of a plurality of devices, wherein each subset of the plurality of subsets is associated with a quantity of time associated with output of a type of content;
   determine, for each subset of the plurality of subsets, based on viewership data associated with each subset of the plurality of subsets, a weight;
   determine, based on the weight for each subset of the plurality of subsets, an index parameter indicative of a likelihood of a device of the subset of the plurality of devices to output the type of content; and
   generate, based on the index parameter, data indicative of a ranking of a plurality of content networks.

27. The non-transitory computer readable medium of claim 26, wherein the processor executable instructions that cause the at least one processor to determine the plurality of subsets further cause the at least one processor to apply a k-means clustering algorithm based on at least one of: a level of viewership, a type of content genre, a type of content network, a type of content program, or a type of content title.

28. The non-transitory computer readable medium of claim 26, wherein the processor executable instructions that cause the at least one processor to determine the plurality of subsets further cause the at least one processor to cluster, based on audience type, the plurality of devices, wherein the audience type comprises at least one of: a genre audience type, a sports content audience type, a cooking content audience type, a chronological age range audience type, a content network audience type, or a content program audience type.

29. The non-transitory computer readable medium of claim 26, wherein the processor executable instructions that cause the at least one processor to determine the plurality of subsets further cause the at least one processor to determine at least one subset threshold, wherein the plurality of subsets of the plurality of devices comprises a first subset associated with a first quantity of output content that is above the at least one subset threshold, a second subset associated with a second quantity of output content that is below the at least one subset threshold, and a third subset associated with a third quantity of output content that is below the second quantity of output content.

30. The non-transitory computer readable medium of claim 26, wherein the processor executable instructions that cause the at least one processor to determine the weight for each subset of the plurality of subsets further cause the at least one processor to:
   determine a first average distance of points of a first subset of the plurality of subsets to a midpoint of the first subset; and
   determine a second average distance of points of a second subset of the plurality of subsets to the midpoint.

31. The non-transitory computer readable medium of claim 26, wherein the processor executable instructions that cause the at least one processor to determine the index parameter further cause the at least one processor to apply, to corresponding index values, the weight for each subset of the plurality of subsets.

32. The non-transitory computer readable medium of claim 26, wherein the processor executable instructions that cause the at least one processor to determine the index parameter further cause the at least one processor to determine a ratio of a portion of the plurality of devices associated with the likelihood to output the type of content and a quantity of the plurality of devices, wherein the portion of the device is associated with viewership of a target device subset during a content time slot, and wherein the quantity of the plurality of devices is associated with viewership by a general audience during the content time slot.

33. The non-transitory computer readable medium of claim 26, wherein the processor executable instructions that cause the at least one processor to generate the data further cause the at least one processor to generate at least one of: a matrix, a list, a spreadsheet, or a table.

34. The non-transitory computer readable medium of claim 26, wherein the processor executable instructions that cause the at least one processor to generate the data further cause the at least one processor to generate an indication of a content network of the plurality of content networks during a content time slot, wherein the content time slot comprises at least one of: early morning, daytime, fringe, late fringe, overnight, or primetime.

35. The non-transitory computer readable medium of claim 26, wherein the processor executable instructions that cause the at least one processor to generate the data further cause the at least one processor to determine a highest ranked content network of the plurality of content networks.

36. A system comprising:
   a plurality of devices configured to output content; and
   a computing device configured to:
      determine, based on a quantity of time associated with output of a type of content, a plurality of subsets of the plurality of devices;
      determine, for each subset of the plurality of subsets, based on different levels of viewership associated with each subset of the plurality of subsets, a weight;
      determine, based on the weight for each subset of the plurality of subsets, an index parameter indicative of a likelihood of a device of the subset of the plurality of devices to output the type of content;

generate, based on the index parameter, data indicative of a plurality of content time slots; and select, based on the data indicative of the plurality of content time slots, a pool of the plurality of devices, wherein the selection comprises a quantity of devices from each subset of the plurality of subsets.

37. The system of claim 36, wherein the computing device configured to determine the plurality of subsets further comprises the computing device configured to determine at least one subset threshold, wherein the plurality of subsets comprises a first subset associated with a first quantity of output content that is above the at least one subset threshold, a second subset associated with a second quantity of output content that is below the at least one subset threshold, and a third subset associated with a third quantity of output content that is below the second quantity of output content.

38. The system of claim 36, wherein the computing device configured to determine the plurality of subsets further comprises the computing device configured to cluster, based on audience type and viewership data, the plurality of devices, wherein the audience type comprises at least one of: a genre audience type, a sports content audience type, a cooking content audience type, a chronological age range audience type, a content network audience type, or a content program audience type.

39. The system of claim 36, wherein the computing device configured to determine the plurality of subsets further comprises the computing device configured to determine, based on at least one subset threshold, a first portion of the plurality of devices in a first subset and a second portion of the plurality of devices in a second subset.

40. The system of claim 36, wherein the computing device configured to determine the weight for each subset of the plurality of subsets of the plurality of devices further comprises the computing device configured to:

determine a first average distance of each device in a first subset to a midpoint of the first subset; and determine a second average distance of each device in a second subset to the midpoint of the first subset.

41. The system of claim 36, wherein the computing device configured to determine the index parameter further comprises the computing device configured to apply, to corresponding index values, the weight for each subset of the plurality of subsets of the plurality of devices.

42. The system of claim 36, wherein the computing device configured to determine the index parameter further comprises the computing device configured to determine a ratio of a portion of the plurality of devices that output the type of content item and the plurality of devices that output the type of content item during the plurality of content time slots, wherein the portion of the plurality of devices correspond to a target device subset.

43. The system of claim 36, wherein the computing device configured to generate the data further comprises the computing device configured to determine, based on the index parameter, a ranking of the plurality of content time slots, wherein the ranking of the plurality of content time slots comprises a highest ranked content time slot.

44. The system of claim 36, wherein the computing device configured to generate the data further comprises the computing device configured to generate a matrix indicative of at least one of: a plurality of content items or a plurality of content channels being output during the plurality of content time slots.

45. The system of claim 36, wherein the plurality of devices are associated with at least one of: output of content, selection of a content type, or content viewership.

46. The system of claim 36, wherein the likelihood of the device to output the type of content is associated with at least one of: a quantity of devices of the subset that output the type of content item during a content time slot of the plurality of content time slots or a likelihood that a device of the quantity of devices that outputs the type of content item during the content time slot is clustered into the subset.

47. The system of claim 36, wherein the computing device is further configured to determine a daypart classification of the plurality of content time slots, wherein the daypart classification comprises at least one of: early morning, daytime, fringe, late fringe, overnight, or primetime.

48. The system of claim 36, wherein the computing device is further configured to determine an average distance between points of each subset of the plurality of subsets and a center point of a subset of the plurality of subsets of the plurality of devices.

49. A system comprising:

a plurality of subsets of devices configured to output content; and a computing device configured to:

receive an indication of a type of content and a request for a ranking of a plurality of content time slots;

determine, based on a weight for each device of a subset of the plurality of subsets of devices, an index parameter indicative of a likelihood of a device of the plurality of subsets of devices to output the type of content; and send, based on the index parameter, data indicative of the plurality of content time slots.

50. The system of claim 49, wherein the computing device configured to receive the request further comprises the computing device configured to receive, from a user device, an indication of a target device subset corresponding to the type of content, wherein the type of content comprises at least one of: a sports content item, an drama content item, a content item for a chronological age range, a genre content item, or a content item title.

51. The system of claim 49, wherein the computing device configured to receive the request further comprises the computing device configured to receive, from a user device, an indication of the plurality of subsets of devices, wherein the plurality of subsets of devices comprises: a first subset associated with a first quantity of output content that is above at least one subset threshold, a second subset associated with a second quantity of output content that is below the at least one subset threshold, and a third subset associated with a third quantity of output content that is below the second quantity of output content.

52. The system of claim 49, wherein the computing device configured to determine the index parameter further comprises the computing device configured to determine a ratio of a portion of the plurality of subsets of devices associated with the likelihood to output the type of content and a quantity of the plurality of subsets of devices.

53. The system of claim 49, wherein the computing device configured to send the data further comprises the computing device configured to send, based on the type of content, at least one of: a matrix, a list, a spreadsheet, or a table.

54. The system of claim 49, wherein the computing device configured to send the data further comprises the computing device configured to send an indication of a highest ranked content time slot of the plurality of content time slots.

55. The system of claim 49, wherein the computing device configured to send the data further comprises the computing device configured to send an indication of a lowest ranked content time slot of the plurality of content time slots.

56. The system of claim 49, wherein each content time slot of the plurality of content time slots defines a time period and a type of content source.

57. The system of claim 49, wherein the plurality of subsets of devices are associated with at least one of: output of content, selection of a content type, or content viewership.

58. The system of claim 49, wherein the computing device is further configured to cluster, based on viewership data, a portion of the plurality of subsets of devices to a target device subset of a plurality of target device subsets.

59. The system of claim 49, the computing device is further configured to determine a weight for each subset of the plurality of subsets of devices based on an average difference between content output times of devices in each subset and a midpoint of a subset of the plurality of subsets of devices, wherein the midpoint comprises a weighted average content output time of the subset and the weight is based on a distance associated with each subset of the plurality of subsets of devices.

60. The system of claim 49, the computing device is further configured to determine, based on clustering devices according to a clustering algorithm, the plurality of subsets of the devices.

61. A system comprising:
a plurality of devices configured to output content; and
a computing device configured to:
determine a plurality of subsets of the plurality of devices, wherein each subset of the plurality of subsets is associated with a quantity of time associated with output of a type of content;
determine, for each subset of the plurality of subsets, based on viewership data associated with each subset of the plurality of subsets, a weight;
determine, based on the weight for each subset of the plurality of subsets, an index parameter indicative of a likelihood of a device of the subset of the plurality of devices to output the type of content; and
generate, based on the index parameter, data indicative of a ranking of a plurality of content networks.

62. The system of claim 61, wherein the computing device configured to determine the plurality of subsets further comprises the computing device configured to apply a k-means clustering algorithm based on at least one of: a level of viewership, a type of content genre, a type of content network, a type of content program, or a type of content title.

63. The system of claim 61, wherein the computing device configured to determine the plurality of subsets further comprises the computing device configured to cluster, based on audience type, the plurality of devices, wherein the audience type comprises at least one of: a genre audience type, a sports content audience type, a cooking content audience type, a chronological age range audience type, a content network audience type, or a content program audience type.

64. The system of claim 61, wherein the computing device configured to determine the plurality of subsets further comprises the computing device configured to determine at least one subset threshold, wherein the plurality of subsets of the plurality of devices comprises a first subset associated with a first quantity of output content that is above the at least one subset threshold, a second subset associated with a second quantity of output content that is below the at least one subset threshold, and a third subset associated with a third quantity of output content that is below the second quantity of output content.

65. The system of claim 61, wherein the computing device configured to determine the weight for each subset of the plurality of subsets further comprises the computing device configured to:
determine a first average distance of points of a first subset of the plurality of subsets to a midpoint of the first subset; and
determine a second average distance of points of a second subset of the plurality of subsets to the midpoint.

66. The system of claim 61, wherein the computing device configured to determine the index parameter further comprises the computing device configured to apply, to corresponding index values, the weight for each subset of the plurality of subsets.

67. The system of claim 61, wherein the computing device configured to determine the index parameter further comprises the computing device configured to determine a ratio of a portion of the plurality of devices associated with the likelihood to output the type of content and a quantity of the plurality of devices, wherein the portion of the plurality of devices is associated with viewership of a target device subset during a content time slot, and wherein the quantity of the plurality of devices is associated with viewership by a general audience during the content time slot.

68. The system of claim 61, wherein the computing device configured to generate the data further comprises the computing device configured to generate at least one of: a matrix, a list, a spreadsheet, or a table.

69. The system of claim 61, wherein the computing device configured to generate the data further comprises the computing device configured to generate an indication of a content network of the plurality of content networks during a content time slot, wherein the content time slot comprises at least one of: early morning, daytime, fringe, late fringe, overnight, or primetime.

70. The system of claim 61, wherein the computing device configured to generate the data further comprises the computing device configured to determine a highest ranked content network of the plurality of content networks.

* * * * *